United States Patent
Cooley et al.

(10) Patent No.: US 11,973,653 B2
(45) Date of Patent: Apr. 30, 2024

(54) AUTOMATIC DISCOVERY OF AUTOMATED DIGITAL SYSTEMS THROUGH LINK SALIENCE

(71) Applicant: Mapped Inc., El Segundo, CA (US)

(72) Inventors: Shaun Cooley, El Segundo, CA (US); Jose De Castro, San Francisco, CA (US); Jason Koh, San Diego, CA (US)

(73) Assignee: MAPPED INC., El Segundo, CA (US)

( * ) Notice: Subject to any disclaimer, the term of this patent is extended or adjusted under 35 U.S.C. 154(b) by 0 days.

(21) Appl. No.: 17/372,267

(22) Filed: Jul. 9, 2021

(65) Prior Publication Data
US 2022/0150124 A1 May 12, 2022

Related U.S. Application Data

(60) Provisional application No. 63/112,268, filed on Nov. 11, 2020.

(51) Int. Cl.
*H04L 41/12* (2022.01)
*G05B 19/05* (2006.01)
(Continued)

(52) U.S. Cl.
CPC .............. *H04L 41/12* (2013.01); *G05B 19/05* (2013.01); *G05B 19/054* (2013.01); *G06F 9/54* (2013.01);
(Continued)

(58) Field of Classification Search
CPC ...................................................... H04L 41/12
(Continued)

(56) References Cited

U.S. PATENT DOCUMENTS

| 5,663,891 A | 9/1997 | Bamji et al. |
| 5,729,466 A | 3/1998 | Bamji |

(Continued)

FOREIGN PATENT DOCUMENTS

| WO | WO-9913418 A1 | 3/1999 |
| WO | WO-2020089259 A1 | 5/2020 |

(Continued)

OTHER PUBLICATIONS

A. Kind, D. Gantenbein and H. Etoh, "Relationship Discovery with NetFlow to Enable Business-Driven IT Management," 2006 IEEE/IFIP Business Driven IT Management, 2006, pp. 63-70, doi: 10.1109/BDIM.2006.1649212. (Year: 2006).*

(Continued)

*Primary Examiner* — James D. Rutten
(74) *Attorney, Agent, or Firm* — WILSON SONSINI GOODRICH & ROSATI

(57) ABSTRACT

Described are platforms, systems, and methods to combine counts of activity correlations over time with a link salience method to identify collections of digital devices in an automated environment to identify sub-systems comprised of portions of the overall environment. The platforms, systems, and methods detect activity in a plurality of data sources associated with an automation environment; determine correlation in the detected activity between two or more of the data sources; store records of determined correlation in the detected activity over time in a data storage system; apply a link salience algorithm to the stored records of determined correlation in the detected activity to determine a salience property; and identify one or more subsystems in the automation environment based on the salience property.

29 Claims, 6 Drawing Sheets

(51) Int. Cl.
| | |
|---|---|
| *G06F 9/54* | (2006.01) |
| *G06F 16/21* | (2019.01) |
| *G06F 16/25* | (2019.01) |
| *G06F 16/901* | (2019.01) |
| *G06F 18/21* | (2023.01) |
| *G06F 18/2415* | (2023.01) |
| *G06N 20/00* | (2019.01) |

(52) U.S. Cl.
CPC .......... *G06F 16/212* (2019.01); *G06F 16/254* (2019.01); *G06F 16/9024* (2019.01); *G06F 18/2178* (2023.01); *G06F 18/24155* (2023.01); *G06N 20/00* (2019.01); *G05B 2219/1215* (2013.01); *G05B 2219/13129* (2013.01); *G05B 2219/15012* (2013.01); *G05B 2219/163* (2013.01)

(58) Field of Classification Search
USPC ...................................................... 709/223
See application file for complete search history.

(56) References Cited

U.S. PATENT DOCUMENTS

| | | | |
|---|---|---|---|
| 7,606,890 B1 | 10/2009 | Baier et al. | |
| 8,773,437 B1* | 7/2014 | Goldman | G06F 16/9024 345/440 |
| 8,819,206 B2 | 8/2014 | Bandi et al. | |
| 9,667,641 B2 | 5/2017 | Muddu et al. | |
| 10,019,536 B2 | 7/2018 | Hong et al. | |
| 10,044,630 B2 | 8/2018 | Kriegesmann et al. | |
| 10,216,706 B1 | 2/2019 | Bonk et al. | |
| 10,353,596 B2 | 7/2019 | Zhou | |
| 10,540,383 B2 | 1/2020 | Cobbett et al. | |
| 10,699,214 B2 | 6/2020 | Chen et al. | |
| 10,901,373 B2 | 1/2021 | Locke et al. | |
| 10,929,777 B2 | 2/2021 | Adjaoute | |
| 10,997,195 B1 | 5/2021 | Sekar | |
| 11,272,011 B1 | 3/2022 | Laughton et al. | |
| 11,455,287 B1 | 9/2022 | Hillion et al. | |
| 11,526,261 B1 | 12/2022 | Leach et al. | |
| 11,636,234 B2 | 4/2023 | Rejeb Sfar et al. | |
| 2003/0212678 A1 | 11/2003 | Bloom et al. | |
| 2004/0049699 A1* | 3/2004 | Griffith | H04L 63/1425 726/23 |
| 2004/0210654 A1* | 10/2004 | Hrastar | H04L 63/1408 709/224 |
| 2004/0260518 A1 | 12/2004 | Polz et al. | |
| 2007/0208440 A1 | 9/2007 | Bliss et al. | |
| 2008/0189402 A1* | 8/2008 | Betzler | H04L 43/00 709/223 |
| 2009/0100407 A1 | 4/2009 | Bouillet et al. | |
| 2010/0014432 A1* | 1/2010 | Durfee | H04L 63/1441 370/242 |
| 2010/0257535 A1* | 10/2010 | Badovinatz | G06Q 10/06 718/104 |
| 2011/0004631 A1 | 1/2011 | Inokuchi et al. | |
| 2011/0087522 A1* | 4/2011 | Beaty | H04L 41/145 705/7.38 |
| 2011/0179027 A1* | 7/2011 | Das | G06F 16/29 707/736 |
| 2011/0295903 A1* | 12/2011 | Chen | G06F 16/367 707/794 |
| 2012/0084422 A1 | 4/2012 | Bandi et al. | |
| 2012/0158745 A1 | 6/2012 | Gorelik et al. | |
| 2012/0158933 A1* | 6/2012 | Shetty | H04L 41/0893 709/223 |
| 2012/0259466 A1 | 10/2012 | Ray et al. | |
| 2012/0321174 A1 | 12/2012 | Tsymbal et al. | |
| 2013/0124465 A1 | 5/2013 | Pingel et al. | |
| 2013/0232123 A1 | 9/2013 | Ahmed et al. | |
| 2014/0122806 A1* | 5/2014 | Lin | H04L 67/12 711/126 |
| 2014/0277604 A1 | 9/2014 | Nixon et al. | |
| 2015/0074078 A1 | 3/2015 | Roche et al. | |
| 2015/0074117 A1 | 3/2015 | Gorelik et al. | |
| 2015/0095770 A1* | 4/2015 | Mani | G06F 40/12 715/254 |
| 2015/0180891 A1* | 6/2015 | Seward | H04L 63/1416 726/22 |
| 2015/0256635 A1* | 9/2015 | Casey | G06F 16/2465 709/224 |
| 2015/0281105 A1* | 10/2015 | Vaderna | H04L 41/12 370/231 |
| 2016/0019228 A1 | 1/2016 | Hong et al. | |
| 2016/0098037 A1 | 4/2016 | Zornio et al. | |
| 2016/0132538 A1 | 5/2016 | Bliss et al. | |
| 2016/0342707 A1 | 11/2016 | Drobek et al. | |
| 2016/0373481 A1* | 12/2016 | Sultan | G06F 21/554 |
| 2017/0085438 A1 | 3/2017 | Link et al. | |
| 2017/0154080 A1 | 6/2017 | De Smet et al. | |
| 2017/0168779 A1 | 6/2017 | Sevenich et al. | |
| 2017/0249434 A1 | 8/2017 | Brunner | |
| 2017/0279687 A1* | 9/2017 | Muntés-Mulero | H04L 41/065 |
| 2017/0286456 A1 | 10/2017 | Wenzel et al. | |
| 2018/0173795 A1 | 6/2018 | Cobbett et al. | |
| 2018/0219888 A1 | 8/2018 | Apostolopoulos | |
| 2018/0219919 A1 | 8/2018 | Crabtree et al. | |
| 2018/0232459 A1 | 8/2018 | Park et al. | |
| 2019/0057064 A1 | 2/2019 | Bonk et al. | |
| 2019/0108197 A1 | 4/2019 | Bonk et al. | |
| 2019/0132145 A1 | 5/2019 | O'Hora | |
| 2019/0133026 A1 | 5/2019 | Seaman et al. | |
| 2019/0158353 A1 | 5/2019 | Johnson et al. | |
| 2019/0187643 A1 | 6/2019 | Carpenter et al. | |
| 2019/0205148 A1 | 7/2019 | Schur et al. | |
| 2019/0220583 A1 | 7/2019 | Douglas et al. | |
| 2019/0324831 A1 | 10/2019 | Gu | |
| 2019/0384238 A1 | 12/2019 | Songkakul | |
| 2020/0004751 A1 | 1/2020 | Stennett et al. | |
| 2020/0280565 A1* | 9/2020 | Rogynskyy | H04L 67/1095 |
| 2020/0296137 A1 | 9/2020 | Crabtree et al. | |
| 2020/0327444 A1* | 10/2020 | Negi | G06N 3/08 |
| 2020/0379992 A1 | 12/2020 | De Smet | |
| 2020/0394455 A1 | 12/2020 | Lee et al. | |
| 2021/0073216 A1 | 3/2021 | Chang et al. | |
| 2021/0090694 A1 | 3/2021 | Colley et al. | |
| 2021/0097446 A1 | 4/2021 | Kim et al. | |
| 2021/0133670 A1 | 5/2021 | Cella et al. | |
| 2021/0157312 A1 | 5/2021 | Cella et al. | |
| 2021/0157671 A1 | 5/2021 | Shastri et al. | |
| 2021/0273965 A1 | 9/2021 | Pi et al. | |
| 2021/0287459 A1 | 9/2021 | Cella et al. | |
| 2021/0293103 A1 | 9/2021 | Olsen et al. | |
| 2021/0333762 A1 | 10/2021 | Govindaraj et al. | |
| 2022/0147008 A1 | 5/2022 | Cooley et al. | |
| 2022/0156433 A1 | 5/2022 | Laane et al. | |
| 2022/0214170 A1 | 7/2022 | Singh et al. | |
| 2023/0004548 A1 | 1/2023 | Papakonstantinou et al. | |
| 2023/0359830 A1 | 11/2023 | Koh | |

FOREIGN PATENT DOCUMENTS

| | | |
|---|---|---|
| WO | WO-2022059588 A1 | 3/2022 |
| WO | WO-2022103812 A1 | 5/2022 |
| WO | WO-2022103813 A1 | 5/2022 |
| WO | WO-2022103820 A1 | 5/2022 |
| WO | WO-2022103822 A1 | 5/2022 |
| WO | WO-2022103824 A1 | 5/2022 |
| WO | WO-2022103829 A1 | 5/2022 |
| WO | WO-2022103831 A1 | 5/2022 |
| WO | WO-2023215892 A1 | 11/2023 |

OTHER PUBLICATIONS

Marcisak, S. (2016). Correlating inferred data plane IPv6 reboot events with control plane BGP activity (Doctoral dissertation, Monterey, California: Naval Postgraduate School). (Year: 2016).*

Cheong. Four ways to quantify synchrony between time series data. Towards Data Science Available athttps://towardsdatascience.com/

(56) References Cited

OTHER PUBLICATIONS four-ways-to-quantify-synchrony-between-time-series-data-b99136c4a9c9 (May 13, 2019).
Co-pending U.S. Appl. No. 17/372,238, inventors Cooley; Shaun et al., filed Jul. 9, 2021.
Co-pending U.S. Appl. No. 17/372,242, inventors Cooley; Shaun et al., filed Jul. 9, 2021.
Co-pending U.S. Appl. No. 17/372,247, inventors Cooley; Shaun et al., filed Jul. 9, 2021.
Co-pending U.S. Appl. No. 17/372,251, inventors Cooley; Shaun et al., filed Jul. 9, 2021.
Co-pending U.S. Appl. No. 17/372,256, inventors Cooley; Shaun et al., filed Jul. 9, 2021.
Co-pending U.S. Appl. No. 17/372,275, inventors Cooley; Shaun et al., filed Jul. 9, 2021.
Grady et al. Robust classification of salient links in complex networks. Nat Commun 3:864 (May 29, 2012).
PCT/US2021/058749 International Search Report and Written Opinion dated Dec. 22, 2021.
PCT/US2021/058756 International Search Report and Written Opinion dated Jan. 11, 2022.
PCT/US2021/058759 International Search Report and Written Opinion dated Dec. 22, 2021.
PCT/US2021/058762 International Search Report and Written Opinion dated Dec. 23, 2021.
PCT/US2021/058768 International Search Report and Written Opinion dated Jan. 24, 2022.
PCT/US2021/058771 International Search Report and Written Opinion dated Jan. 11, 2022.
U.S. Appl. No. 17/372,238 Non-Final Office Action dated Jan. 19, 2022.
U.S. Appl. No. 17/372,247 Non-Final Office Action dated Dec. 13, 2021.
U.S. Appl. No. 17/372,251 Office Action dated Nov. 5, 2021.
U.S. Appl. No. 17/372,242 Office Action dated Nov. 15, 2021.
U.S. Appl. No. 17/372,256 Office Action dated Oct. 29, 2021.
U.S. Appl. No. 17/372,275 Office Action dated Nov. 10, 2021.
George et al. Big data and management. Academy of management Journal 57(2):321-326 (2014). Retrieved on Jan. 8, 2022 from https://journals.aom.org/doi/abs/10.5465/amj.2014.4002?journalCode=amj.
PCT/US2021/058748 International Search Report and Written Opinion dated Feb. 9, 2022.
U.S. Appl. No. 17/372,238 Final Office Action dated Apr. 19, 2022.
U.S. Appl. No. 17/372,242 Final Office Action dated Mar. 4, 2022.
U.S. Appl. No. 17/372,247 Final Office Action dated Apr. 26, 2022.
U.S. Appl. No. 17/372,251 Final Office Action dated Feb. 22, 2022.
U.S. Appl. No. 17/372,256 Final Office Action dated Feb. 18, 2022.
U.S. Appl. No. 17/372,275 Final Office Action dated Mar. 4, 2022.
U.S. Appl. No. 17/372,247 Non-Final Office Action dated Nov. 14, 2022.
Co-pending U.S. Appl. No. 18/144,101, inventor KOH; Jason, filed May 5, 2023.
U.S. Appl. No. 17/372,247 Final Office Action dated Mar. 30, 2023.
U.S. Appl. No. 18/144,101 Non-Final Office Action dated Jul. 14, 2023.
Abualdenien et al. Ensemble-learning approach for the classification of Levels of Geometry (LOG) of building elements. Advanced Engineering Informatics 51:101497 (2022).
PCT/US2023/066693 International Search Report and Written Opinion dated Sep. 25, 2023.
U.S. Appl. No. 17/372,247 Notice of Allowance dated Nov. 7, 2023.
U.S. Serial No. 18/144, 101 Notice of Allowance dated Oct. 27, 2023.

\* cited by examiner

AUTOMATIC DISCOVERY OF AUTOMATED DIGITAL SYSTEMS THROUGH LINK SALIENCE

CROSS-REFERENCE TO RELATED APPLICATIONS

This application is related to co-pending applications U.S. application Ser. No. 17/372,238, U.S. application Ser. No. 17/372,242, U.S. application Ser. No. 17/372,247, U.S. application Ser. No. 17/372,251, U.S. application Ser. No. 17/372,256, and U.S. application Ser. No. 17/372,275, all filed on the same date, Jul. 9, 2021, the same date on which the present application was filed. This application claims the priority and benefit of U.S. Provisional Application No. 63/112,268, filed Nov. 11, 2020, and entitled: DATA INTEGRATION AND ENRICHMENT PLATFORM FOR AUTOMATED INDUSTRIAL AND COMMERCIAL ENVIRONMENTS. All of these applications are incorporated herein by reference in their entireties.

BACKGROUND

Automation is the use of control systems to operate processes without human intervention. These systems generally include software, computers, beacons, sensors, actuators, and in some cases robotics. In industrial and commercial settings, benefits of automation include increases in productivity, accuracy, flexibility, and safety, while providing overall cost savings. A "smart building" uses a combination of technologies to automate building management. The terms "smart office" and "smart home" are used to describe a structure that uses technology to allow systems and electronics to communicate with one another, be controlled by a time schedule, and even be remotely activated from a smartphone or other web-enabled device. A few of the systems that can be controlled include lighting, heating, ventilation, air conditioning, vertical lifts, fire safety systems, appliances, and security systems. As such, smart buildings can provide comfort and convenience while enhancing security and energy efficiency. Cities of the future are anticipated to offer a wide array of "smart technologies," e.g., networked technology that controls aspects of transportation, energy, air, and water quality.

SUMMARY

Automated industrial and commercial environments largely consist of commodity components assembled in a bespoke manner. Across the various verticals, such as manufacturing, commercial buildings, energy production, transportation, oil & gas, and cities, there are tens of thousands of different models of equipment from thousands of vendors that speak one of a few hundred different protocols. This extreme heterogeneity has resulted in a requirement for humans to be involved in the provisioning, deployment, and maintenance of these otherwise automated systems.

As these environments are now connected to IP-based networks for monitoring and control, through what is typically called the Internet of Things (IoTs), the relationships and structure of relationships between different IoT devices are often masked by the complexity of the network and the heterogeneity between IoT devices' protocols. In many instances, humans need to reverse engineer what groups of devices within the environment comprise systems. For example, in a large commercial building, there might be 2 chillers, 4 cooling towers, 40 air handling units (AHUs), 200 fan coils, 200 dampers, and 400 thermostats. To figure out which sets of thermostat, dampers, fan coils, AHUs, and chillers make up a subsystem, and similarly which cooling towers are used by which chillers, the current state of the art requires manually reverse engineering logic in the building's HVAC programmable logic controller (PLC). This is extremely time consuming and error prone.

Described herein are platforms, systems, and methods that automatically identify collections of digital devices (e.g., IoT devices) in an automated environment to identify subsystems comprised of portions of the overall automated environment through the use of activity correlations and link salience. The following components, in various embodiments, are needed to implement the platforms, systems, and methods described herein Data or data source discovery mechanism;
Activity detection mechanism;
Correlation determination mechanism;
Salience determination mechanism; and
Data storage system.

Accordingly, in one aspect, disclosed herein are computer-implemented methods comprising: detecting activity in a plurality of data sources associated with an automation environment; determining correlation in the detected activity between two or more of the data sources; storing records of determined correlation in the detected activity over time in a data storage system; applying a link salience algorithm to the stored records of determined correlation in the detected activity to determine a salience property; and identifying one or more subsystems in the automation environment based on the salience property. In some embodiments, the automation environment comprises at least one networked industrial or commercial automation system. In various embodiments, the plurality of data sources comprises at least one sensor, at least one actuator, at least one effector, at least one programmable logic controller (PLC), at least one automation controller, at least one data file, at least one cloud service, or a combination thereof. In various embodiments, the plurality of data sources comprises at least 1,000, at least 10,000, or at least 100,000 data sources. In some embodiments, the method further comprises identifying a plurality of data sources associated with an automation environment. In further embodiments, the identifying the plurality of data sources is performed by passive discovery, active discovery, target interrogation, or a combination thereof. In still further embodiments, the passive discovery comprises observing traffic on a network or a serial bus. In still further embodiments, the passive discovery comprises identifying an origin or a destination for the traffic. In further embodiments, the active discovery comprises IP subnet scanning on a network, port scanning on a network, protocol specific ID enumeration on a control bus, issuing protocol specific discovery commands on a network, or a combination thereof. In further embodiments, the target interrogation comprises introspecting at least one device on a network. In some embodiments, the activity comprises one or more events or one or more state changes in at least one data source. In some embodiments, the determining activity correlation comprises statistical analysis of counts of the stored records of determined correlation in the detected activity overtime. In further embodiments, the statistical analysis comprises autocorrelation/serial correlation, partial autocorrelation, cross-correlation, or a combination thereof. In some embodiments, the determining correlation in the detected activity between two or more of the data sources comprises: identifying combinatorial pairs of data sources having activity within a predetermined time window; conducting pairwise testing for each identified combinatorial pair of data sources by applying a correlation algorithm to the stored records of correlation in the detected activity over time; and determining one or more relationships for at least one identified combinatorial pair of data sources. In further embodiments, the correlation algorithm comprises one or more of the following: Pearson correlation, Time Lagged Cross Correlation (TLCC), Windowed TLCC, Dynamic Time Warping (DTW), and Instantaneous Phase Synchrony. In further embodiments, the correlation algorithm comprises a machine learning model. In various further embodiments, the machine learning model comprises one or more of the following: one or more neural networks, one or more deep neural networks, one or more support vector machines (SVM), one or more Bayesian models, linear regression, logistic regression, or k-means clustering. In some embodiments, the data storage system comprises a graph database. In further embodiments, the graph database comprises a representation of the automation environment. In further embodiments, the graph database comprises a digital twin of the automation environment. In still further embodiments, individual data sources are represented as vertices in the graph database and relationships between the individual data sources are represented as edges in the graph database. In still further embodiments, each edge comprises counts of determined correlation in the detected activity over time. In still further embodiments, the counts of determined correlation in the detected activity over time are stored as a property or metadata associated with the edge. In some embodiments, the method further comprises contributing the identified subsystems back to the graph database as data enrichments. In some embodiments, the contributing the identified subsystems back to the graph database as data enrichments comprises creating, updating, or deleting vertices in the graph, edges in the graph, vertex properties in the graph, or edge properties in the graph. In some embodiments, detecting activity in a plurality of data sources comprises passive inspection of packets or payloads on an automation control network associated with the automation environment. In some embodiments, the detecting activity in a plurality of data sources comprises inspection of communications in accordance with a communication protocol. In further embodiments, the communication protocol comprises S7, BACnet, KNX, or a combination thereof. In some embodiments, the detecting activity in a plurality of data sources is performed by a gateway, slave controller, or computer in communication with the automation environment directly, indirectly, via a cloud service, or any combination thereof. In some embodiments, the steps are performed by a computer-based platform automatically.

In another aspect, disclosed herein are systems comprising at least one computing device comprising at least one processor, a memory, and instructions executable by the at least one processor to create an application comprising: a software module detecting activity in a plurality of data sources associated with an automation environment; a software module determining correlation in the detected activity between two or more of the data sources; a software module storing records of determined correlation in the detected activity over time in a data storage system; a software module applying a link salience algorithm to the stored records of determined correlation in the detected activity to determine a salience property; and a software module identifying one or more subsystems in the automation environment based on the salience property. In some embodiments, the automation environment comprises at least one networked industrial or commercial automation system. In various embodiments, the plurality of data sources comprises at least one sensor, at least one actuator, at least one effector, at least one programmable logic controller (PLC), at least one automation controller, at least one data file, at least one cloud service, or a combination thereof. In various embodiments, the plurality of data sources comprises at least 1,000, at least 10,000, or at least 100,000 data sources. In some embodiments, the application further comprises a software module identifying a plurality of data sources associated with an automation environment. In further embodiments, the software module identifying the plurality of data sources utilizes passive discovery, active discovery, target interrogation, or a combination thereof. In still further embodiments, the passive discovery comprises observing traffic on a network or a serial bus. In still further embodiments, the passive discovery comprises identifying an origin or a destination for the traffic. In further embodiments, the active discovery comprises IP subnet scanning on a network, port scanning on a network, protocol specific ID enumeration on a control bus, issuing protocol specific discovery commands on a network, or a combination thereof. In further embodiments, the target interrogation comprises introspecting at least one device on a network. In some embodiments, the activity comprises one or more events or one or more state changes in at least one data source. In some embodiments, the software module determining activity correlation utilizes statistical analysis of counts of the stored records of determined correlation in the detected activity over time. In various further embodiments, the statistical analysis comprises autocorrelation/serial correlation, partial autocorrelation, cross-correlation, or a combination thereof. In some embodiments, the software module determining correlation in the detected activity between two or more of the data sources performs operations comprising: identifying combinatorial pairs of data sources having activity within a predetermined time window; conducting pairwise testing for each identified combinatorial pair of data sources by applying a correlation algorithm to the stored records of correlation in the detected activity over time; and determining one or more relationships for at least one identified combinatorial pair of data sources. In further embodiments, the correlation algorithm comprises one or more of the following: Pearson correlation, Time Lagged Cross Correlation (TLCC), Windowed TLCC, Dynamic Time Warping (DTW), and Instantaneous Phase Synchrony. In further embodiments, the correlation algorithm comprises a machine learning model. In various embodiments, the machine learning model comprises one or more of the following: one or more neural networks, one or more deep neural networks, one or more support vector machines (SVM), one or more Bayesian models, linear regression, logistic regression, or k-means clustering. In some embodiments, the data storage system comprises a graph database. In further embodiments, the graph database comprises a representation of the automation environment. In further embodiments, the graph database comprises a digital twin of the automation environment. In still further embodiments, individual data sources are represented as vertices in the graph database and relationships between the individual data sources are represented as edges in the graph database. In still further embodiments, each edge comprises counts of determined correlation in the detected activity over time. In still further embodiments, the counts of determined correlation in the detected activity over time are stored as a property or metadata associated with the edge. In some embodiments, the application further comprises a software module contributing the identified subsystems back to the graph database as data enrichments. In further embodiments, software module contributing the identified subsystems back to the graph database as data enrichments creates, updates, or deletes vertices in the graph, edges in the graph, vertex properties in the graph, or edge properties in the graph. In some embodiments, the software module detecting activity in a plurality of data sources utilizes passive inspection of packets or payloads on an automation control network associated with the automation environment. In some embodiments, the software module detecting activity in a plurality of data sources utilizes inspection of communications in accordance with a communication protocol. In further embodiments, the communication protocol comprises S7, BACnet, KNX, or a combination thereof. In some embodiments, the software module detecting activity in a plurality of data sources is implemented at a gateway, slave controller, or computer in communication with the automation environment directly, indirectly, via a cloud service, or any combination thereof. In some embodiments, the software modules are implemented at a computer-based platform and operate automatically.

In another aspect, disclosed herein are non-transitory computer-readable storage media encoded with instructions executable by one or more processors to provide an application comprising: an activity module configured to detect activity in a plurality of data sources associated with an automation environment; a correlation module configured to determine correlation in the detected activity between two or more of the data sources; a data storage module configured to store records of determined correlation in the detected activity over time in a data storage system; a link salience module configured to apply a link salience algorithm to the stored records of determined correlation in the detected activity to determine a salience property; and a subsystem module configured to identify one or more subsystems in the automation environment based on the salience property. In some embodiments, the automation environment comprises at least one networked industrial or commercial automation system. In various embodiments, wherein the plurality of data sources comprises at least one sensor, at least one actuator, at least one effector, at least one programmable logic controller (PLC), at least one automation controller, at least one data file, at least one cloud service, or a combination thereof. In various embodiments, the plurality of data sources comprises at least 1,000, at least 10,000, or at least 100,000 data sources. In some embodiments, the application further comprises a discovery module configured to identify a plurality of data sources associated with an automation environment. In further embodiments, the discovery module utilizes passive discovery, active discovery, target interrogation, or a combination thereof. In still further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, protocol specific ID enumeration on a control bus, issuing protocol specific discovery commands on a network, or a combination thereof. In further embodiments, the target interrogation comprises introspecting at least one device on a network. In some embodiments, the activity comprises one or more events or one or more state changes in at least one data source. In some embodiments, the correlation module utilizes statistical analysis of counts of the stored records of determined correlation in the detected activity over time. In further embodiments, the statistical analysis comprises autocorrelation/serial correlation, partial autocorrelation, cross-correlation, or a combination thereof. In some embodiments, the correlation module performs operations comprising: identifying combinatorial pairs of data sources having activity within a predetermined time window; conducting pairwise testing for each identified combinatorial pair of data sources by applying a correlation algorithm to the stored records of correlation in the detected activity over time; and determining one or more relationships for at least one identified combinatorial pair of data sources. In further embodiments, the correlation algorithm comprises one or more of the following: Pearson correlation, Time Lagged Cross Correlation (TLCC), Windowed TLCC, Dynamic Time Warping (DTW), and Instantaneous Phase Synchrony. In some embodiments, the correlation algorithm comprises a machine learning model. In various further embodiments, the machine learning model comprises one or more of the following: one or more neural networks, one or more deep neural networks, one or more support vector machines (SVM), one or more Bayesian models, linear regression, logistic regression, or k-means clustering. In some embodiments, the data storage system comprises a graph database. In further embodiments, the graph database comprises a representation of the automation environment. In further embodiments, the graph database comprises a digital twin of the automation environment. In still further embodiments, individual data sources are represented as vertices in the graph database and relationships between the individual data sources are represented as edges in the graph database. In still further embodiments, each edge comprises counts of determined correlation in the detected activity over time. In still further embodiments, the counts of determined correlation in the detected activity over time are stored as a property or metadata associated with the edge. In some embodiments, the application further comprises a data enrichment module configured to contribute the identified subsystems back to the graph database as data enrichments. In further embodiments, the data enrichment module creates, updates, or deletes vertices in the graph, edges in the graph, vertex properties in the graph, or edge properties in the graph. In some embodiments, the activity module performs passive inspection of packets or payloads on an automation control network associated with the automation environment. In some embodiments, the activity module performs inspection of communications in accordance with a communication protocol. In further embodiments, the communication protocol comprises S7, BACnet, KNX, or a combination thereof. In some embodiments, the activity module is implemented at a gateway, slave controller, or computer in communication with the automation environment directly, indirectly, via a cloud service, or any combination thereof. In some embodiments, the modules are implemented at a computer-based platform and operate automatically.

In another aspect, disclosed herein are computer-implemented methods comprising: detecting activity in a plurality of data sources associated with an automation environment; determining correlation in the detected activity between two or more of the data sources; storing records of determined correlation in the detected activity over time in a data storage system; and applying a statistical or machine learning algorithm to the stored records of determined correlation in the detected activity to identify one or more subsystems in the automation environment.

In another aspect, disclosed herein are systems comprising at least one computing device comprising at least one processor, a memory, and instructions executable by the at least one processor to create an application comprising: a software module detecting activity in a plurality of data sources associated with an automation environment; a software module determining correlation in the detected activity between two or more of the data sources; a software module storing records of determined correlation in the detected activity over time in a data storage system; and a software module applying a statistical or machine learning algorithm to the stored records of determined correlation in the detected activity to identify one or more subsystems in the automation environment.

In another aspect, disclosed herein are non-transitory computer-readable storage media encoded with instructions executable by one or more processors to provide an application comprising: an activity module configured to detect activity in a plurality of data sources associated with an automation environment; a correlation module configured to determine correlation in the detected activity between two or more of the data sources; a data storage module configured to store records of determined correlation in the detected activity over time in a data storage system; and a link salience module configured to apply a statistical or machine learning algorithm to the stored records of determined correlation in the detected activity to identify one or more subsystems in the automation environment.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
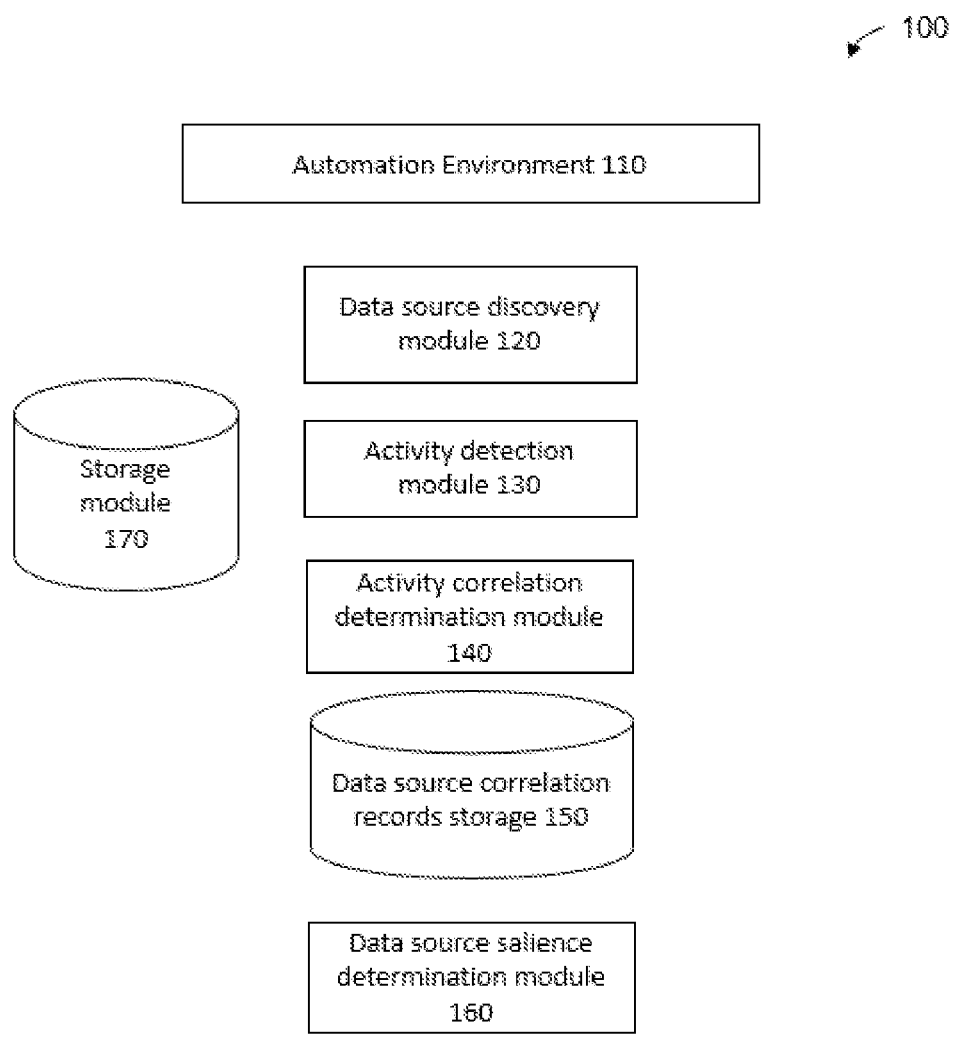
FIG. 1 shows a non-limiting example of a schematic diagram; in this case, a schematic diagram showing components (e.g., modules, mechanisms, etc.) utilized by embodiments described herein.

Described herein, in certain embodiments, are computer-implemented methods comprising: detecting activity in a plurality of data sources associated with an automation environment; determining correlation in the detected activity between two or more of the data sources; storing records of determined correlation in the detected activity over time in a data storage system; applying a link salience algorithm to the stored records of determined correlation in the detected activity to determine a salience property; and identifying one or more subsystems in the automation environment based on the salience property.

Also described herein, in certain embodiments, are systems comprising at least one computing device comprising at least one processor, a memory, and instructions executable by the at least one processor to create an application comprising: a software module detecting activity in a plurality of data sources associated with an automation environment; a software module determining correlation in the detected activity between two or more of the data sources; a software module storing records of determined correlation in the detected activity over time in a data storage system; a software module applying a link salience algorithm to the stored records of determined correlation in the detected activity to determine a salience property; and a software module identifying one or more subsystems in the automation environment based on the salience property.

Also described herein, in certain embodiments, are non-transitory computer-readable storage media encoded with instructions executable by one or more processors to provide an application comprising: an activity module configured to detect activity in a plurality of data sources associated with an automation environment; a correlation module configured to determine correlation in the detected activity between two or more of the data sources; a data storage module configured to store records of determined correlation in the detected activity over time in a data storage system; a link salience module configured to apply a link salience algorithm to the stored records of determined correlation in the detected activity to determine a salience property; and a subsystem module configured to identify one or more subsystems in the automation environment based on the salience property.

Also described herein, in certain embodiments, are computer-implemented methods comprising: detecting activity in a plurality of data sources associated with an automation environment; determining correlation in the detected activity between two or more of the data sources; storing records of determined correlation in the detected activity over time in a data storage system; and applying a statistical or machine learning algorithm to the stored records of determined correlation in the detected activity to identify one or more subsystems in the automation environment.

Also described herein, in certain embodiments, are systems comprising at least one computing device comprising at least one processor, a memory, and instructions executable by the at least one processor to create an application comprising: a software module detecting activity in a plurality of data sources associated with an automation environment; a software module determining correlation in the detected activity between two or more of the data sources; a software module storing records of determined correlation in the detected activity over time in a data storage system; and a software module applying a statistical or machine learning algorithm to the stored records of determined correlation in the detected activity to identify one or more subsystems in the automation environment.

Also described herein, in certain embodiments, are non-transitory computer-readable storage media encoded with instructions executable by one or more processors to provide an application comprising: an activity module configured to detect activity in a plurality of data sources associated with an automation environment; a correlation module configured to determine correlation in the detected activity between two or more of the data sources; a data storage module configured to store records of determined correlation in the detected activity over time in a data storage system; and a link salience module configured to apply a statistical or machine learning algorithm to the stored records of determined correlation in the detected activity to identify one or more subsystems in the automation environment.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the "Internet of Things" or "IoT" refers to the network of physical devices, buildings, vehicles, and other objects that feature an IP address for internet network connectivity for exchanging data, wherein the network comprises, for example, ethernet, IP, serial buses, and/or other forms of communication between two or more IoT devices.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular structures, features, or characteristics may be combined in any suitable manner in one or more embodiments.

Automation Environment

In some embodiments, the platforms, systems, and methods described herein are implemented in relation to an automation environment. In further embodiments, the automation environment comprises electronically controllable equipment with one or more sensors, one or more actuators, and/or one or more effectors, as well as one or more automation controllers—either centralized and/or distributed. As this environment is the target of the logic and functionality described herein, the environment, in some cases, exists before the platforms, systems, and methods described herein are applied to it. In other cases, the environment is implemented with, e.g., proximate in time to, the platforms, systems, and methods described herein.

Many automation environments are suitable, including, by way of non-limiting examples, industrial environments, such as manufacturing environments and assembly environments, infrastructure, transportation, freight or shipping environments, smart cities, agricultural environments, military environments, law enforcement environments, commercial environments, such as smart building environments, smart office environments, healthcare environments, and retail environments, as well as residential environments, such as smart home environments, and the like. In some embodiments, the automation environments include cloud storage and/or computing system.

In various embodiments, the electronically controllable equipment comprises, by way of non-limiting examples, a smart manufacturing device (e.g., a robot, manufacturing actuator, assembly line sensor, etc.), a utility device (e.g., a water meter, transformer, gas meter, etc.), pipeline monitoring device, power plant monitoring device, electrical grid monitoring device, an environmental sensor (e.g., a carbon dioxide sensor, pollution detector, salinity meter, light meter, etc.), a weather sensor (e.g., humidity sensor, temperature sensor, rain gauge, anemometer, barometer, etc.), a transportation asset (e.g., a car, truck, watercraft, train, bus, aircraft, unmanned vehicle, GPS receiver, etc.), a freight or shipping asset (e.g., a shipping container, cargo, truck, rail car, watercraft, aircraft, etc.), a smart city device (e.g., a parking meter, utility meter, lighting device, traffic monitoring camera, emergency calling device, etc.), an agriculture device (e.g., a farming machine, soil sensor, irrigation device, etc.), a homeland security device (e.g., a body scanner, metal detector, radiation detector, biological agent detector, weapon, vehicle, drone, perimeter intrusion detector, gunfire locator, breathalyzer, etc.), a smart office device (e.g., an access control device, security system, HVAC system, vertical lifts, fire safety system, lighting system, printer, coffee maker, etc.), a point-of-sale (PoS) system (e.g., a payment device, receipt printer, barcode or QR code scanner, etc.), a health care device (e.g., a drug infusion pump, pacemaker, defibrillator, patient health monitoring device, etc.), as well as a smart home device (e.g., a security system, door lock, lighting device, appliance, thermostat, smoke detector, virtual assistant, smart speaker, etc.), and the like.

Data Sources

As described herein, in some embodiments, the automation environment comprises one or more pieces of electronically controllable equipment. In further embodiments, the electronically controllable equipment further comprises one or more of the following components: a microcontroller (MCU), a microprocessor (MPU), a memory or storage component, firmware, software, a networking/communications component, a sensing component (e.g., a sensor), an electronic circuit connected to the sensing component, an actuating component (e.g., an actuator and/or an effector), an electronic circuit connected to the actuating component, and an energy source. In some embodiments, one or more of the components are physically separate from a piece of electronically controllable equipment. In some embodiments, one or more of the components are integrated with, or embedded in, a piece of electronically controllable equipment.

In some embodiments, the automation environment comprises one or more cloud storage and/or computing systems, which in some cases are located remotely from the data integration pipeline. For example, some devices (e.g., pieces of electronically controllable equipment) are configured to communicate with a cloud storage and/or computing system. In these embodiments, the data integration pipeline discovers and/or extracts data from cloud APIs. In some embodiments, the data integration pipeline processes data both from on-premise systems and cloud systems.

In some embodiments, the networking/communication element includes a receiver, a transmitter, and/or a transceiver. In further embodiments, the networking/communication element comprises a radio frequency (RF) transceiver with an antenna or connection for an external antenna. Suitable transceivers include, by way of non-limiting examples, a Wi-Fi transceiver, a cellular transceiver, a Bluetooth transceiver, and the like.

In some embodiments, the electronically controllable equipment, or components thereof, comprises an IP address for internet connectivity. In further embodiments, the equipment may be associated with a MAC address or an SSID. It is understood that equipment may connect with other devices through wired or wireless connections, which allow for transfer (e.g., transmission, reception, or both) of data.

In some embodiments, the automation environment comprises one or more networks via which the electronically controllable equipment, or components thereof, sends and/or receives data. In various embodiments, the network comprises ethernet, IP, serial buses, and other forms of communication between two or more IoT devices. In further embodiments, the one or more networks comprise one or more IoT networks, one or more data packet-switched networks, one or more wireless sensor networks (WSN), and/or one or more wireless sensor and actuator networks (WSAN). In various embodiments, a network described herein is wireless network utilizing Wi-Fi, WiMAX, ZigBee, Z-Wave, Bluetooth, Bluetooth Low Energy (BLE), Near-Field Communication (NFC), or Light-Fidelity (Li-Fi). In some embodiments, a network described herein is wireless network utilizing LTE or 5G. In some embodiments, a network described herein is wireless network utilizing a low-power wide-area network (LPWAN) protocol, such as LoRa. In other embodiments, a network described herein is wired network utilizing Ethernet, serial, RS422 or RS485 serial bus, 1-Wire, CAN, DMX, or power line communication.

In some embodiments, one or more devices form nodes in the network. In some embodiments, a network described herein includes a central node for controlling the network. In some embodiments, the automation environment comprises electronically controllable equipment, or components there, that have hierarchical relationships, such as a controller/controlled relationship, a master/slave relationship, or the like. In some embodiments, a network described herein has a distributed architecture to reduce the impact of a failed device or node. In some embodiments, a network described herein consists of a peer-to-peer relationship between two or more devices.

The automation environment suitably comprises a wide range of numbers of data sources, including, by way of examples, pieces of electronically controllable equipment, local and remote data stores, and remote cloud computing services/resources, including APIs to provide data from remote computing services/resources. In various embodiments, the automation environment suitably comprises, by way of non-limiting examples, at least 5, at least 10, at least 50, at least 100, at least 500, at least 1,000, at least 5,000, at least 10,000, at least 50,000, or at least 100,000 data sources, including increments therein. In various further embodiments, the automation environment suitably comprises, by way of non-limiting examples, at least 500,000, at least 1,000,000, at least 5,000,000, at least 10,000,000, at least 50,000,000, at least 100,000,000, or at least 500,000,000 data sources, including increments therein.

In some embodiments, the automation environment comprises an automation controller, either centralized or distributed. For example, in some embodiments, the automation environment comprises one or more programmable logic controllers (PLC). A PLC is a microprocessor-based controller with programmable memory used to store program instructions and functions. In some embodiments, one or more of the PLCs are ruggedized. In various embodiments, a PLC comprises a processor unit (MCU or the MPU) which interprets inputs, executes the control program stored in memory, and sends output signals, a power supply unit which, in some cases, converts AC voltage to DC, a memory unit storing data from inputs and program instructions to be executed by the processor unit, an input and output interface, by which the PLC sends data to external devices and receives data from external devices, and a communications interface to receive and transmit data on communication networks. In further embodiments, a PLC comprises a real-time operating system, such as OS-9, Sedona, Niagara, or VxWorks. In various embodiments, PLC functionality includes, by way of examples, sequential relay control, motion control, process control, distributed control systems, and networking. In particular embodiments, a PLC is programmed with a device used to develop and later download a program into the memory of the PLC. The programming device, in various cases, includes a desktop console, special software on a personal computer, or a handheld programming device. In some cases, the program is downloaded to the PLC directly or over a network and stored either in non-volatile flash memory or battery-backed-up RAM.

In some embodiments, the MCU or the MPU receives data from a sensing component and transmits the data to the transmitter or transceiver to be transmitted to other remotely located elements within a network. In some embodiments, the receiver or transceiver receives data, for example, control data from remotely located devices, and such data gets relayed to the MCU or the MPU to generate commands to one or more other components. In such embodiments, a sensing component and/or an actuation component performs one or more functions(s) based on the received command. In some embodiments, an electrical circuit is utilized in data transfer among a sensing component, an actuation component, the MCU or MPU, and the networking/communications element.

Many sensors are suitable including, by way of non-limiting examples, GPS receivers, wearable sensors, mobile sensors, fixed sensors, and the like. In various embodiments, the electronically controllable equipment, or components thereof, and/or networks described herein comprise one or more of: an audio/acoustic sensor, a breathalyzer, a temperature sensor, a carbon dioxide sensor, a carbon monoxide sensor, an infrared sensor, an oxygen sensor, an ozone monitor, a pH sensor, a smoke detector, an electrical current sensor, an electrical voltage detector, a magnetometer, a metal detector, a radio direction finder, an air flow meter, an anemometer, a flow sensor, a gas meter, a water meter, a Geiger counter, an altimeter, an air speed indicator, a depth gauge, a gyroscope, a compass, an odometer, a shock detector, a barometer, a pressure gauge, a thermometer, a proximity sensor, a motion detector, an occupancy sensor, an inertial sensor, a gyroscope, or any combination thereof, and in some embodiments, sensor data comprises information obtained from any of the sensors described herein. Other examples of sensors include, but are not limited to, location sensors, vision sensors (e.g., imaging devices capable of detecting visible, infrared, or ultraviolet light, such as cameras, etc.), proximity sensors (e.g., ultrasonic sensors, LiDAR, time-of-flight cameras, etc.), inertial sensors (e.g., accelerometers, gyroscopes, inertial measurement units (IMUs), etc.), and field sensors (e.g., magnetometers, electromagnetic sensors, etc.). In particular embodiments, one or more sensors are configured to measure health parameters such as heart rate, pulse, electric signals from the heart, blood oxygen levels, blood pressure, blood sugar level, and the like. In particular embodiments, one or more sensors are configured to measure environmental parameters such as light, motion, temperature, pressure, humidity, vibration, magnetic field, sound, smoke, carbon monoxide, radiation, hazardous chemicals, acid, base, reactive compounds, volatile organic compounds, smog, and the like.

Any suitable number and combination of sensors can be used, such as one, two, three, four, five, or more sensors.

Optionally, the data can be received from sensors of different types (e.g., two, three, four, five, or more types). Sensors of different types may measure different types of signals or information and/or utilize different types of measurement techniques to obtain data. For instance, the sensors may include any suitable combination of active sensors (e.g., sensors that generate and measure energy from their own source) and passive sensors (e.g., sensors that detect available energy).

Suitable actuators include, by way of non-limiting examples, electric (e.g., a motor, servo, solenoid, piezoelectric actuator, etc.), hydraulic, pneumatic (e.g., vacuum- or compressed gas-based actuators), magnetic, thermal (e.g., shape memory alloy-based actuators), soft, and mechanical actuators.

Suitable effectors include, by way of non-limiting examples, impactive, ingressive, astrictive, and contigutive effectors.

Overview of Exemplary Embodiments

The platforms, systems, and methods described herein interact with an automation environment and are implemented with multiple suitable architectures. Non-limiting examples are provided herein.

Referring to FIG. 1, in a particular embodiment, the platforms and systems 100 include, and methods utilize, an automation environment 110, a data source discovery/identification 120, an activity detection module 130, a module 140, a data source correlation records storage module 150, a data source salience determination module 160 in communication with a storage module 170 (which in some cases comprises a graph database). The data source salience determination module 150 may be a sub-storage unit of the storage module 170.

Figure 2:
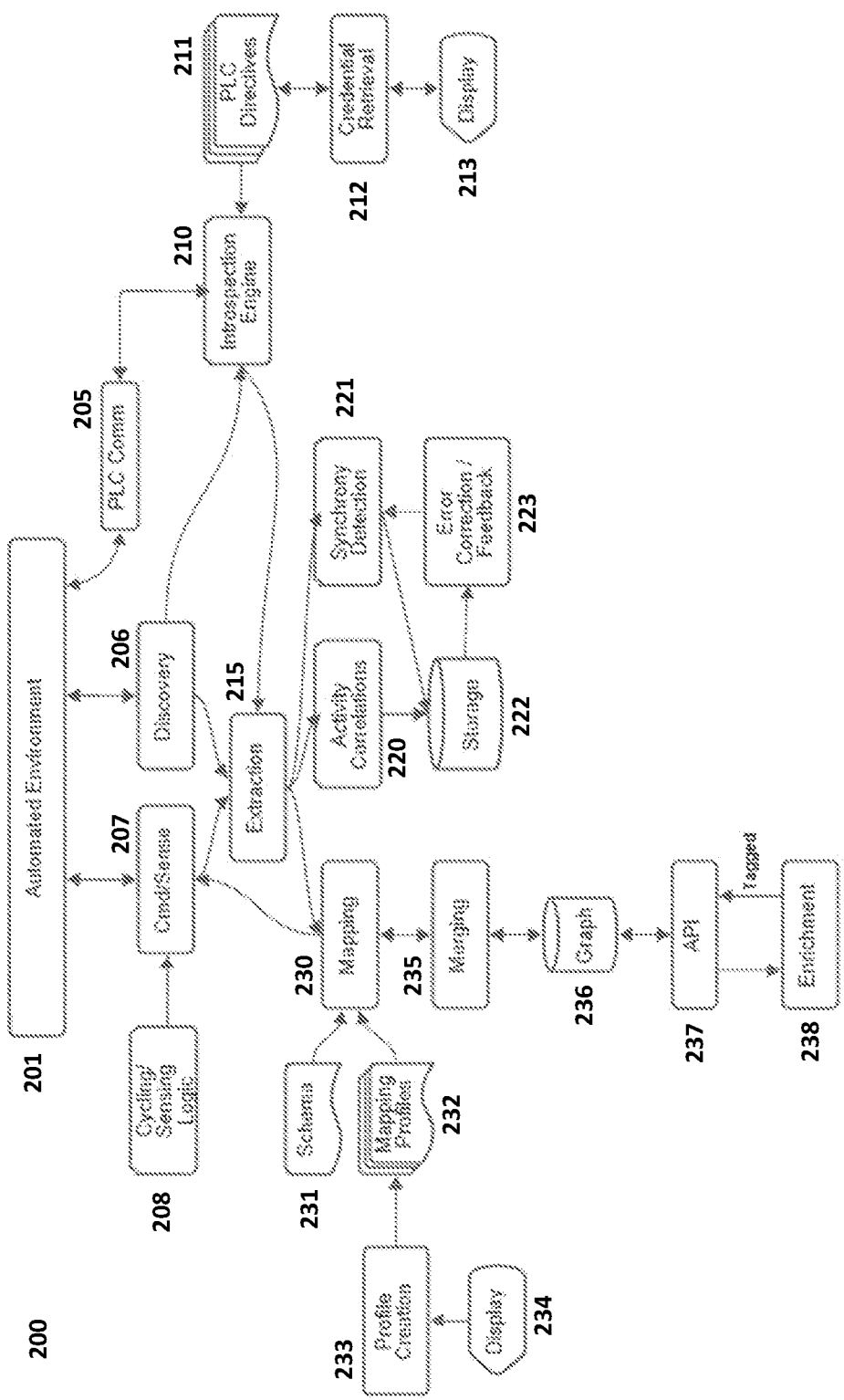
FIG. 2 shows a non-limiting example of a schematic diagram; in this case, a schematic diagram illustrating overall architecture and procedural aspects of the platforms, systems, and methods described herein.

Referring to FIG. 2, in a particular embodiment, the overall platforms and systems 200 are implemented in relation to an automation environment 201, and the methods utilize the automation environment 201. In this embodiment, a discovery module 206 and a command/sense module 207 interact directly with the automation environment 201 to conduct protocols to gain data about the environment and feed the data to an extraction module 215. The discovery module 206 provides data to an introspection engine 210, which communicates with a PLC communications module 205. In this embodiment, the introspection engine 210 receives one or more PLC directives 211, which may require credential retrieval 212 and presentation of an interface for showing credentials on a display 213 and/or receiving credentials, and the introspection engine 210 sends the PLC directives 211 to the PLC communications module 205 for issuance into the automation environment 201. Further, in this embodiment, a cycling/sensing logic module 208 provides instruction to the command/sense module 207 for interaction with the automation environment 201.

Continuing to refer to FIG. 2, in this particular embodiment, the command/sense module 207, the discovery module 206, and the introspection engine 210 provide data to the extraction module 215. In this embodiment, the extraction module 215 provides data to the activity correlations module 220 and the synchrony detection module 221, which are in communication with a storage module 222 and an error correction and feedback mechanism 223. In this embodiment, the extraction module 215 also provides data to the mapping module 230. By way of example, the mapping module 230 receives a mapping schema 231 and one or more mapping profiles 232, which may require profile creation 233 and presentation of an interface for showing profiles on a display 234 and/or receiving profiles. The mapping module 230 utilizes the schema 231 and the one or more profiles 232 to map the data extracted by the extraction module 215 and communicates the output to a merging module 235. Finally, in this embodiment, the merging module 235 is in communication with a graph database 236. An enrichment module 238 provides data enrichments, such as tagging (e.g., origin tagging, etc.), and access to the graph database 236 and the enrichments is provided via one or more APIs 237.

Figure 3:
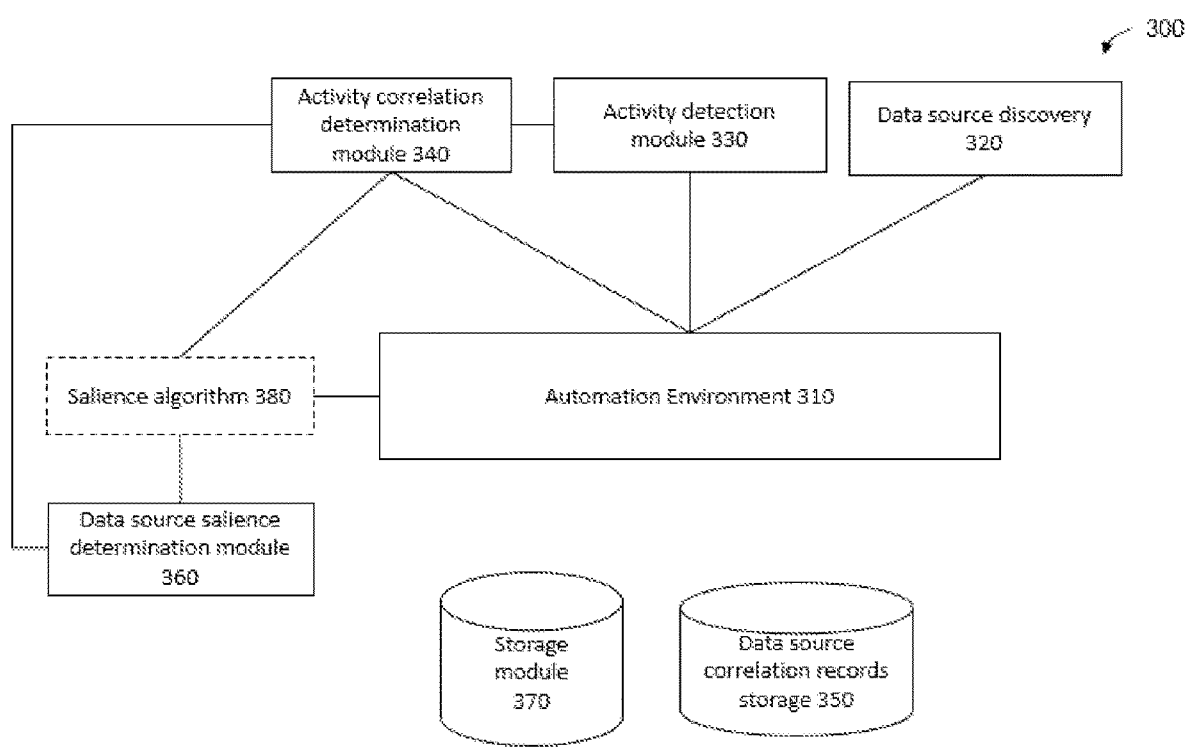
FIG. 3 shows a non-limiting example of a schematic diagram; in this case, a schematic diagram illustrating architecture and procedural aspects of the platforms, systems, and methods for automatic discovery of automated digital systems through link salience according to embodiments described herein.

Referring to FIG. 3, in a particular embodiment, the automatic discovery of automated digital systems through link salience 300 is implemented in relation to an automation environment 310, and the methods utilize the automation environment 310. In this embodiment, a data source discovery/identification module 320 interacts with the automation environment 310 to conduct protocols to gain data about the environment and to identify data sources in the automation environment 310. An activity detection module 330 interacts with the automation environment 310 and detect activities of one or more identified data sources. In some embodiments, the activity comprises one or more events or one or more state changes in the data sources. The activity correlation determination module 340 interacts with the automation environment 310 and the activity detection module 330 and determines correlation in the detected activity of the data sources in the automation environment 310. In some embodiments, the activity correlation determination module 340 interacts directly with activity detection module 330 and determines correlation in the detected activities of the data sources in the automation environment 310. The determined correlations may be stored in the data source correlation records storage 350 for later user. In some embodiments, the activity correlation determination module 340 identifies combinatorial pairs in the one or more identified data sources that having an activity within a time window, and then conducts pairwise testing for each of the identified combinatorial pairs of data sources. The pairwise testing conducted by the activity correlation determination module 340 may apply correlation algorithms (e.g., salience algorithm 380) to the determined correlation records that stored in the data source correlation records storage 350. The activity correlation determination module 340 may interact directly with the data source salience determination module 360 to determine one or more relationships (e.g., salience properties) for the identified combinatorial pair of data sources, wherein the data source salience determination module 360 may inquire the salience algorithm module 380 for suitable algorithms or subset. The determined salience property may be used to identify subsystems in the automation environment 310, and the storage module 370 (e.g., graph database) may be used to store the identified subsystems. In some embodiments, the identified subsystems may be used to contribute back to the graph database. The data source correlation records storage 350 may be a sub-storage unit of the storage module 370.

Figure 4:
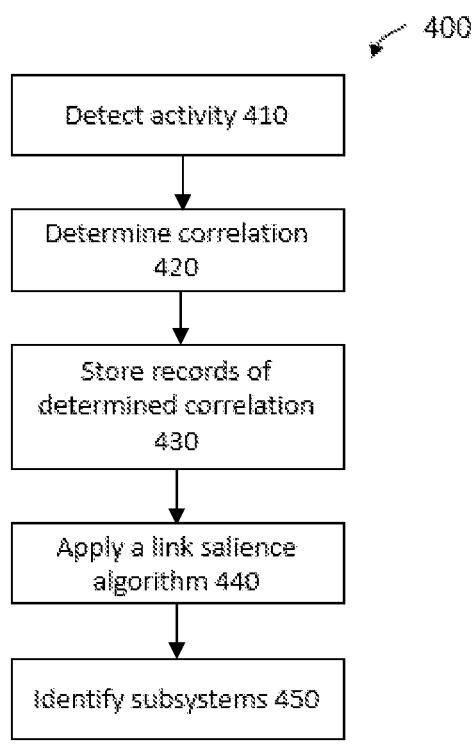
FIG. 4 shows a non-limiting example of a process flow diagram; in this case, a process flow diagram illustrating automatic discovery of automated digital systems through link a salience process according to a first embodiment described herein.

Referring to FIG. 4, in a particular embodiment, a process for automatic discovery of automated digital systems through link salience 400 begins with detecting activity 410 in a plurality of data sources associated with an automation environment. The detecting of activities comprises passive inspection of packets or payloads on an automation control network associated with the automation environment. In some other embodiments, the detecting of activities comprises inspection of communications in accordance with a communication protocol (e.g., S7, BACnet, KNX, or a combination thereof). In further embodiments, the detecting of activities comprises monitoring the automation environment for a predefined monitoring period, substantially continuously, or continuously. The detecting of activities may be performed by a gateway, a slave controller, or a computing device in communication with the automation environment directly, indirectly, via a cloud service, or any combination thereof. Next, the process 400 proceeds to determine correlation 420 in the detected activity between two or more of the data sources. In some embodiments, determining correlation in the detected activity between two of more data sources comprises identifying combinatorial pairs of data sources having an activity within a predetermined time window, conducting pairwise testing for each identified combinatorial pair of data sources by applying a correlation algorithm to the stored records of correlation in the detected activity over time, and determining one or more relationship for the identified combinatorial pair of data sources. The algorithm comprises one or more of the following: Pearson correlation, Time Lagged Cross Correlation (TLCC), Windowed TLCC, Dynamic Time Warping (DTW), and Instantaneous Phase Synchrony.

The process 400 proceeds to store 430 the determined correlation in a database (e.g., a timeseries database or a graph database). The database may comprise a stream of activities for each of the identified data sources, associated with timestamps respectively. Next, the process 400 proceeds to apply a link salience algorithm 440 to the stored records of the determined correlation in the detected activity to determine a salience property. The algorithm comprises one or more of the following: Pearson correlation, Time Lagged Cross Correlation (TLCC), Windowed TLCC, Dynamic Time Warping (DTW), and Instantaneous Phase Synchrony. Alternatively or additionally, the algorithm comprises a machine learning model, wherein the machine learning model comprises one or more of the following: one or more neural networks, one or more deep neural networks, one or more support vector machines (SVM), one or more Bayesian models, linear regression, logistic regression, or k-means clustering. The process 400 then process to identify 450 one or more subsystems in the automation environment based on the determined salience property.

Figure 5:
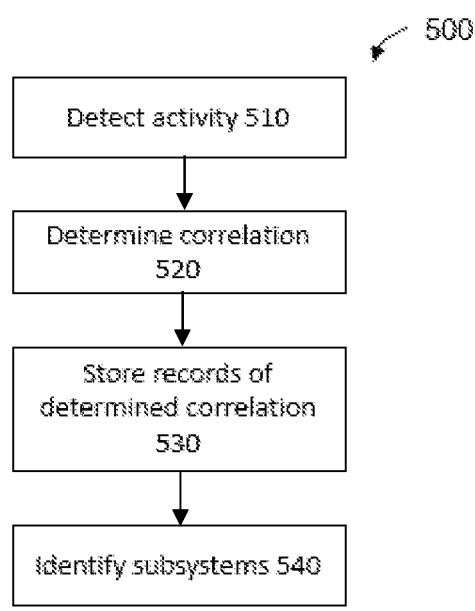
FIG. 5 shows a non-limiting example of a process flow diagram; in this case, a process flow diagram illustrating automatic discovery of automated digital systems through a link salience process according to a second embodiment described herein.

Referring to FIG. 5, in a particular embodiment, a process for automatic discovery of automated digital systems through link salience 500 begins with detecting activity 510 in a plurality of data sources associated with an automation environment. The detecting of activities comprises passive inspection of packets or payloads on an automation control network associated with the automation environment. In some other embodiments, the detecting of activities comprises inspection of communications in accordance with a communication protocol (e.g., S7, BACnet, KNX, or a combination thereof). In further embodiments, the detecting of activities comprises monitoring the automation environment for a predefined monitoring period, substantially continuously, or continuously. The detecting of activities may be performed by a gateway, a slave controller, or a computing device in communication with the automation environment directly, indirectly, via a cloud service, or any combination thereof. Next, the process 500 proceeds to determine correlation 520 in the detected activity between two or more of the data sources. In some embodiments, determining correlation in the detected activity between two of more data sources comprises identifying combinatorial pairs of data sources having an activity within a predetermined time window, conducting pairwise testing for each identified combinatorial pair of data sources by applying a correlation algorithm to the stored records of correlation in the detected activity over time, and determining one or more relationship for the identified combinatorial pair of data sources. The algorithm comprises one or more of the following: Pearson correlation, Time Lagged Cross Correlation (TLCC), Windowed TLCC, Dynamic Time Warping (DTW), and Instantaneous Phase Synchrony. The process 500 proceeds to store 530 the determined correlation in a database (e.g., a timeseries database or a graph database). The database may comprise a stream of activities for each of the identified data sources, associated with timestamps respectively. Next, the process 500 proceeds to identify 540 one or more subsystems in the automation environment by applying a statistical or machine learning algorithm to the stored records of determined correlation in the detected activity.

Data or Data Source Discovery Mechanism

One component of the platforms and systems described herein, and utilized by the methods described herein is the data or data source discovery mechanism. See, e.g., FIG. 1 at 120, FIG. 2 at 206, and FIG. 3 at 320. This will vary based on the environment the system is targeting but, in various embodiments, includes one or more of: passive discovery, active discovery, and target interrogation. As described elsewhere herein, the automation environment comprises at least one networked industrial or commercial automation system. The data sources (IoT devices) comprise devices utilizing a first communication protocol and devices utilizing a second communication protocol; the first communication protocol is different than the second communication protocol. Passive discovery is typically done by observing network traffic, whether IP, serial, or otherwise, between the potential data sources. In some embodiments, passive discovery comprises observing traffic on a network or a serial bus, wherein the passive discovery may identify an origin or a destination for the traffic. When a known protocol is used, the origin and destination are recorded as a potential data source. Active discovery comprises IP subnet scanning on a network, port scanning on a network, issuing protocol specific discovery commands on a network, or a combination thereof. Active discovery is usually protocol specific, but can range from "whois" commands in protocols like BACnet to IP subnet and port scanning for IP based systems. Again, when a device is found that speaks a desired protocol, it is recorded as a potential data source. Lastly, target interrogation includes actively speaking one or more protocols to a potential target to obtain additional information. Target interrogation comprises introspecting at least one PLC on a network. In general, a known or discovered device is interrogated to find out about other known devices—and when more devices are found, they are similarly interrogated. Additionally, data sources can also be found in file shares or be manually entered, such as a cloud service.

A particular exemplary methodology for target interrogation is found in U.S. patent application Ser. No. 17/372,275, entitled SUBTENDED DEVICE MAPPING THROUGH CONTROLLER INTROSPECTION, filed on Jul. 9, 2021 and listing as inventors Shaun Cooley, Jose de Castro, and Jason Koh, which is hereby incorporated by reference in its entirety. This exemplary methodology utilizes communication methods set up for programming and configuration of controllers by human technicians. A collection of protocol specific PLC introspection directives is assembled. Each of these directives drives an introspection engine to reach in to the controller to obtain the necessary information. The engine obtains the make/model of a controller, finding the appropriate introspection directives, executing the sequence of commands, and then processing the final output. In this example, the data or data source discovery mechanism discovers devices that are subtended to a controller by masquerading as a human technician in order to obtain the controller's internal configuration and programming.

Activity Detection System

Another component of the platforms and systems described herein, and utilized by the methods described herein is the activity detection mechanism. See, e.g., FIG. 1 at 130 and FIG. 3 at 330. After the data or data source discovery mechanism produces a list of potential data sources, the activity detection component is responsible for detecting activity (e.g., events or state changes) in the data sources (e.g., IoT devices). This is done by inspecting communications in accordance with a communication protocol. In some embodiment, the communication protocols comprise the native protocol, such as BACnet, modbus, S7, or other automation protocol that the source is able to speak or respond on, or the file format if pulling data from a file, such as a CSV. In various embodiments, activity is detected on a schedule, in response to an event, as a result of passively observing communications among data sources, or pushed from the source directly to this extraction component, or some combination of these. In some embodiments, detecting activity is performed by a gateway, slave controller, or a computer in communication with the automation environment directly, indirectly, via a cloud service, or any combination thereof. As this component detects activity, it actively forwards it to other mechanism, such as the activity correlation determination mechanism, which typically transits a network. In preferred embodiments, the receiving end of this data will store the activity in its raw form so that the raw data could be replayed in to the system if any of the subsequent components are improved after the initial detection of the activity through the system.

Mechanism for Determining Activity Correlation

Another component of the platforms and systems described herein, and utilized by the methods described herein is activity_correlation determination mechanism. See, e.g., FIG. 1 at 140, FIG. 2 at 220, and FIG. 3 at 340. The activity_correlation determination mechanism may determine correlation in the detected activity between two or more of the data sources (e.g., IoT devices). In some embodiments, the activity correlation determination module identifies combinatorial pairs in the one or more identified data sources that having an activity within a predetermined time window, and then conducts pairwise testing for each of the identified combinatorial pairs of data sources by applying a correlation algorithm to the stored records of correlation in the detected activity over time. The pairwise testing conducted by the activity correlation determination module may determine one or more relationships for at least one identified combinatorial pair of data sources. The correlation algorithm comprises one or more of the following: Pearson correlation, Time Lagged Cross Correlation (TLCC), Windowed TLCC, Dynamic Time Warping (DTW), and Instantaneous Phase Synchrony. In some embodiments, the correlation algorithm comprises a machine learning (ML) model. The ML model comprises one or more of the following: neural networks, deep neural networks, support vector machines (SVM), Bayesian models, linear regression, logistic regression, and/or k-means clustering. In some other embodiments, the activity_correlation determination mechanism comprises statistical analysis of counts of the stored records of determined correlation in the detected activity over time. The statistical analysis comprises autocorrelation/serial correlation, partial autocorrelation, cross-correlation, or a combination thereof. For example, the activity correlation determination mechanism may look for statistical correlations between activity in two or more pieces of equipment. If one piece of equipment always turns on right after a state changes (e.g., change from state 1 to state 2) of another piece of equipment, the two events may be correlated. Therefore, there is a high probability that the two pieces of equipment is related. The counts of these correlations over time should be stored as a property or metadata associated with edge between two vertices in the graph, as described below in connection with storage unit.

Mechanism for Storing Correlation Records

Another component of the platforms and systems described herein, and utilized by the methods described herein is correlation records storage mechanism. See, e.g., FIG. 1 at 150 and FIG. 3 at 350. The correlation records storage mechanism is responsible for storing records of determined correlation in the detected activity over time. In some embodiments, the correlation records storage mechanism comprises a graph database, and the determined correlation may be stored, in the graph database, as a property or metadata associated with the edge between two vertices in the graph. This correlation records storage mechanism may be a stand-alone storage, or it may be a sub-storage unit of a universal storage system.

Mechanism for General Data Storage

Another component of the platforms and systems described herein, and utilized by the methods described herein, is a general data storage mechanism. See, e.g., FIG. 1 at 170, FIG. 2 at 222, and FIG. 3 at 370. A simple relational database could be used by data storage mechanism. In a relational database, the devices are rows in a table and the relationships are foreign keys, or as a set of files that each contains details of one device and metadata indicating relationships to other devices. In another example, a combination of relational database and a time-series database may be used by the data storage mechanism. A time-series database may reflect the data changes of the data source overtime. Generally, a relational database enjoys the benefit of robust secondary index support, complex predicates, a rich query language, etc. However, when the data changes rapidly overtime, the volume of data can scale up enormously. Thus, it is preferable to have a separate time-series database works alongside the relational database to better store the events or state changes.

In another preferred example, the data storage component utilizes a graph database to store the received data. A graph database may comprise a representation of the automation environment. In some embodiments, the graph database comprises a digital twin of the automation environment. A graph database is a database that uses graph structure for semantic queries with nodes (please note that "node" and "vertex" are used interchangeably in this application), edges, and properties to represent and store data. Individual data sources (e.g., IoT devices) may be represented by vertices in the graph database, and relationships between the individual data sources may be represented by edges in the graph database. As described elsewhere herein, the determined correlation between data sources may be stored along with edge between the vertices representing these data sources. In some cases, the edge also comprises counts of determined correlation in the detected activities. The data storage component (e.g., correlation records storage mechanism) of the present subject matter provides a data structure wherein each vertex (node) in the graph also has a time-series store to capture data changes overtime. The time-series store may be a standalone database, or it can be defined as a property of the vertex (node). For example, the temperature data extracted from temperature sensor O at 8 PM on Jan. 27, 2021 may be stored in a graph database. The node in the graph may represent sensor O (which is a data source according to the present subject matter) and the value is 27° C. The timestamp 8 PM on Jan. 27, 2021 is stored as property for this node in the graph of the graph database. The time-series store may be associated with the nodes, and it may reflect the state changes overtime and provide a user with actionable insight. Subsequently, for example, the temperature data extracted from the same temperature sensor O at a later time, such as at 11 PM on Jan. 27, 2021 may be stored in the graph database. The same node in the graph still represents sensor O and the value is changed to 20° C. The timestamp 11 PM on Jan. 27, 2021 is stored as property for this node in the graph of the graph database. This constitute an activity (e.g., event or state change) associated with sensor O. These activities associated with every IoT devices are observed by the present platforms and systems to determine correlations between data. For example, when there is an activity (e.g., event or state change) associated with sensor O every time when there is an activity associated with HVAC system P, and there has been about 6 times (i.e., counts, which stored by the edge between O and P) of these correlations between the activities associated with O and P, the activity correlation mechanism may determine that O and P are related.

Link Salience Mechanism

Another component of the platforms and systems described herein, and utilized by the methods described herein is the link salience mechanism. See, e.g., FIG. 1 at 160 and FIG. 3 at 360. The link salience mechanism is responsible for applying a link salience algorithm to the stored records of determined correlation to determine a salience property, and identify subsystems in the automation environment based on the salience property. As described elsewhere herein, the data from data source may be stored in a graph database, and the correlations (i.e., relationships) between data sources may be represented by edges in the graph. For example, the edge between sensor O and HVAC P may be used to store the relationship between them. The link salience mechanism may apply a link salience to the stored relationship or records of determined correlation between them to determine a salience property. For example, the edge between sensor O and HVAC P may have a property, which defines the weight of the edge. In some embodiments, the counts of determined correlation between two data sources may be used to determine the weight of the edge. When there are more counts of correlations, the weight of the edge may be assigned with a bigger number. Next, the distance between two nodes (e.g., vertices representing data sources) is defined by 1/the weight. When the correlation counts is a greater number, the weight is a bigger number, thus the distance between two nodes is shorter in the graph. Once the distances between nodes are calculated, the link salience component may compute the shortest path to all other nodes in the network (e.g., the automation environment). Next, the link salience component may combine all the edges into a set, which forms a Shortest Path Tree (SPT). For each edge in the SPT, the link salience component increases a salience counter, for example, increase the value of property for these edges by a predetermined amount (e.g., 1). For each node (e.g., each data source/IoT device), the link salience component repeats the above steps to generate a salience counter for the edges connecting them. For each edge, the link salience component may then divide the total salience counter by the total number of nodes in the network to generate a final salience property for the edges.

The graph database representing the automation environment uses nodes to represent the IoT devices and the edges to represent the correlations between IoT devices. In some embodiments, the property for the edges that defines the weight is the count of activity correlation, as described elsewhere herein. Because the automation environment (e.g., industrial or commercial environment) are generally distributed according to power law, the calculated salience will have a bimodal distribution. The bimodal distribution allows the link salience component to filter all edges by the top N % link salience to achieve a series of nearly fully connected sub-graphs (subsystems) wherein nearly all routes between any two nodes in each sub-graph (subsystem) is unique. These sub-graphs consist of truck, branch, and leaf vertices. The leaf vertices have one edge, connecting the vertices to the sub-graph. The branch may have a few edges, and the truck vertices have more numbers of edges. The resulting sub-graph edges can be contributed back to the graph for storage and retrieval for later use. The edges may be unidirectional or bidirectional, depending on the methods for activity correlation detection and generation. Generally, a unidirectional edge may represent a causal relationship between the connecting nodes.

Mechanism for Error Correction Feedback

Another component of the platforms and systems described herein, and utilized by the methods described herein is error correction feedback mechanism. See, e.g., FIG. 2 at 223. As described above, the platforms and systems of the present subject matter provides a living representation of the data rather than a static view of the data, which enables a user to understand the meaning of the data. In some cases, a determined relationship between two data sources can be a relationship that does not make sense, and is the result of a pure coincidence. For example, a temperature sensor O's reading always drops by 5 degrees between 5 PM and 6 PM, and a HVAC system P located in a different facility is always turned off at 5 PM. Based on the reading of the events and state changes, the system may determine there is causal relationship between the temperature sensor O and the HVAC system P, wherein the Power off event of the HVAC system P is the cause of the dropping of the temperature sensor O's reading. However, if a user is presented with this relationship, he or she can quickly recognize that the HVAC system P should not have any meaningful relationship with temperature sensor O because they are not in the same facility. The user may then manually de-link the relationship between the two data sources in the graph database. This de-link operation may be facilitated by the error correction feedback component. In some embodiments, the error correction feedback component marks this de-link operation as a training example to feed to the machine learning algorithm. The machine learning algorithm may train itself with this operation. Overtime, the machine learning algorithm may understand that data sources from different facilities, even appear to be combinatorial pairs and have state changes corresponding to each other, may not be true combinatorial pairs and should not be assigned with a relationship between them. Further, the machine learning algorithm may train itself to detect errors by itself. In some embodiments, the error correction feedbacks may propagate throughout the entire platforms and system of the present subject matter, thus other potential errors may be flagged and detected. With the deployment of machine learning algorithm, the relationship determination component, and the error correction component, the platforms and systems of present subject matter may continuously evolve and provide even more accurate and effortless relationship determination operations.

Data Mapping Mechanism

Another component of the platforms and systems described herein, and utilized by the methods described herein is the data mapping mechanism. See, e.g., FIG. 2 at 230. The mapping mechanism is responsible for mapping data from the source format to an ontology, such as a strongly-typed ontology, used by subsequent components in the pipeline. This component optionally comprises a manually crafted set of mapping rules or logic (including those comprising one or more heuristics) to take a known input schema and produce an output schema, such as an XSLT file (Extensible Stylesheet Language Transformations) or even simple field mapping (A→7). In some embodiments, this mapping mechanism optionally comprises complex machine learning based transformation that is trained from interactive data transformation performed by humans or by the data integration pipeline, which improves over time. Example machine learning models include, by way of examples, regular or deep neural networks, support vector machines, Bayesian models, linear regression, logistic regression, k-means clustering, or the like.

A particular exemplary methodology for mapping and normalizing extracted data is found in U.S. patent application Ser. No. 17/372,256, entitled DATA MAPPING BASED ON DEVICE PROFILES, filed on Jul. 9, 2021 and listing as inventors Shaun Cooley, Jose de Castro, and Jason Koh, which is hereby incorporated by reference in its entirety. This exemplary methodology utilizes a data mapping mechanism positioned between the discovered devices and the target schema or ontology and is responsible for converting the data extracted from devices to the target ontology by applying device mapping profiles that were looked up in the storage and lookup system for device mapping profiles using the make/model/firmware or fingerprint of extracted from the device providing data.

Data Merging Method

Another component of the platforms and systems described herein, and utilized by the methods described herein is the data merging mechanism. See, e.g., FIG. 2 at 235. The data merging method takes data that has been mapped to the system's ontology by the mapping component and merges it into the data storage mechanism, described above. It is important that the mapped data is merged and not just simply loaded as the data storage mechanism contains a living representation of the data, the relationships among the data, and any enrichments that were introduced by subsequent components. Simply loading the data would introduce a static view of data that is incapable of evolving further and similarly wouldn't align with the enriched and evolved model. The merge process, in some embodiments, includes matching mapped source data with evolved vertices in the graph, which optionally involves knowing both provenance and history of each vertex in the graph. In further embodiments, once matched, any new properties, shape details, or relationships can be merged into the matched vertices and any timeseries data recorded in the vertex's timeseries store. At this point data is simultaneously available to API callers, stream destinations, and the enrichment mechanisms.

Data Enrichment Mechanism

Another component of the platforms and systems described herein, and utilized by the methods described herein is the data enrichment mechanism. See, e.g., FIG. 2 at 238. Data enrichment mechanisms watch the real-time stream of graph and timeseries data in order to enrich the graph by creating, updating, or deleting vertices, edges (relationships), or vertex/edge properties in the graph. In general, these enrichment mechanisms look for patterns in the graph, the timeseries, or both through mechanisms such as simple pattern matching, statistical analysis, machine learning, or even human processing.

A particular exemplary methodology for data enrichment is found in U.S. patent application Ser. No. 17/372,251, entitled GRAPH DATA ENRICHMENT, filed on Jul. 9, 2021 and listing as inventors Shaun Cooley, Jose de Castro, and Jason Koh, which is hereby incorporated by reference in its entirety. This exemplary methodology utilizes a mechanism to allow downstream processing of graph structure and data to feed back into the graph in order to benefit all other users of the graph through real-time enrichment of vertices, edges, and related data within the graph database. First, in this example, updates to the graph, timeseries data, or both are received, e.g., by scheduled polling of the graph or timeseries data through queries, polling of a changelog, or a real-time feed of changes in the graph or timeseries data being pushed to interested parties (local to the graph or remote). Second, in this example, data enrichments are produced, e.g., by one or more mechanisms in or out of band. In preferred embodiments, multiple instances of data enrichment mechanisms are each configured to produce a specific enrichment and receive graph or timeseries data updates and analyze the new state of the graph through rules based, heuristic, statistical, or machine learning based systems to determine if an enrichment should be created, updated, or deleted. Finally, in this example, enrichments are contributed back to the graph database, timeseries data, or both with origin tagging, e.g., by receiving a stream of vertex, edge, and property creation, update, and delete requests from the various instances of the data enrichment(s) components, and merging the deltas into the graph. In preferred embodiments, each delta merged into the graph is tagged with the identity of the enrichment component that created it (e.g., origin tagging) so that future updates or deletions can be properly applied, thus avoiding duplicate or abandoned elements in the graph.

Further examples of data enrichment are provided in U.S. patent application Ser. No. 17/372,238, entitled AUTOMATIC DISCOVERY OF RELATIONSHIPS AMONG EQUIPMENT THROUGH AUTOMATED CYCLING AND OBSERVATION, filed on Jul. 9, 2021 and listing as inventors Shaun Cooley, Jose de Castro, and Jason Koh, and U.S. patent application Ser. No. 17/372,242, entitled AUTOMATIC DISCOVERY OF RELATIONSHIPS AMONG EQUIPMENT THROUGH OBSERVATION OVER TIME, filed on Jul. 9, 2021 and listing as inventors Shaun Cooley, Jose de Castro, and Jason Koh, each of which are hereby incorporated by reference in its entirety.

APIs and Streams for Accessing the Normalized, Merged, and Enriched Data

Another component of the platforms and systems described herein, and utilized by the methods described herein is one or more APIs and/or real-time data streams and/or live data feeds. See, e.g., FIG. 2 at 237. The last component needed for the platforms, systems, and methods described herein is some combination of APIs and streams for accessing the normalized, merged, and enriched data. While this data pipeline adds immense value to the original raw data that entered the pipeline, the resulting data would be useless if it couldn't be accessed. In various embodiments, the final destination of the processed data is other applications, running either locally or remotely, that will access the data either by polling an API for new data or using a callback, webhook, or web socket type mechanism to receive a stream of data in real-time. These applications must also be aware of any enrichments that came into existence after the initial delivery of data, so all delivered data must be uniquely identifiable so subsequent updates can be correlated.

In a preferred embodiment, this pipeline can also process data in reverse to push changes that are made to the data storage system, by enrichment mechanisms or other users of the API, back through the merging and mapping component and in to the automation environment as commands.

Computing System

Figure 6:
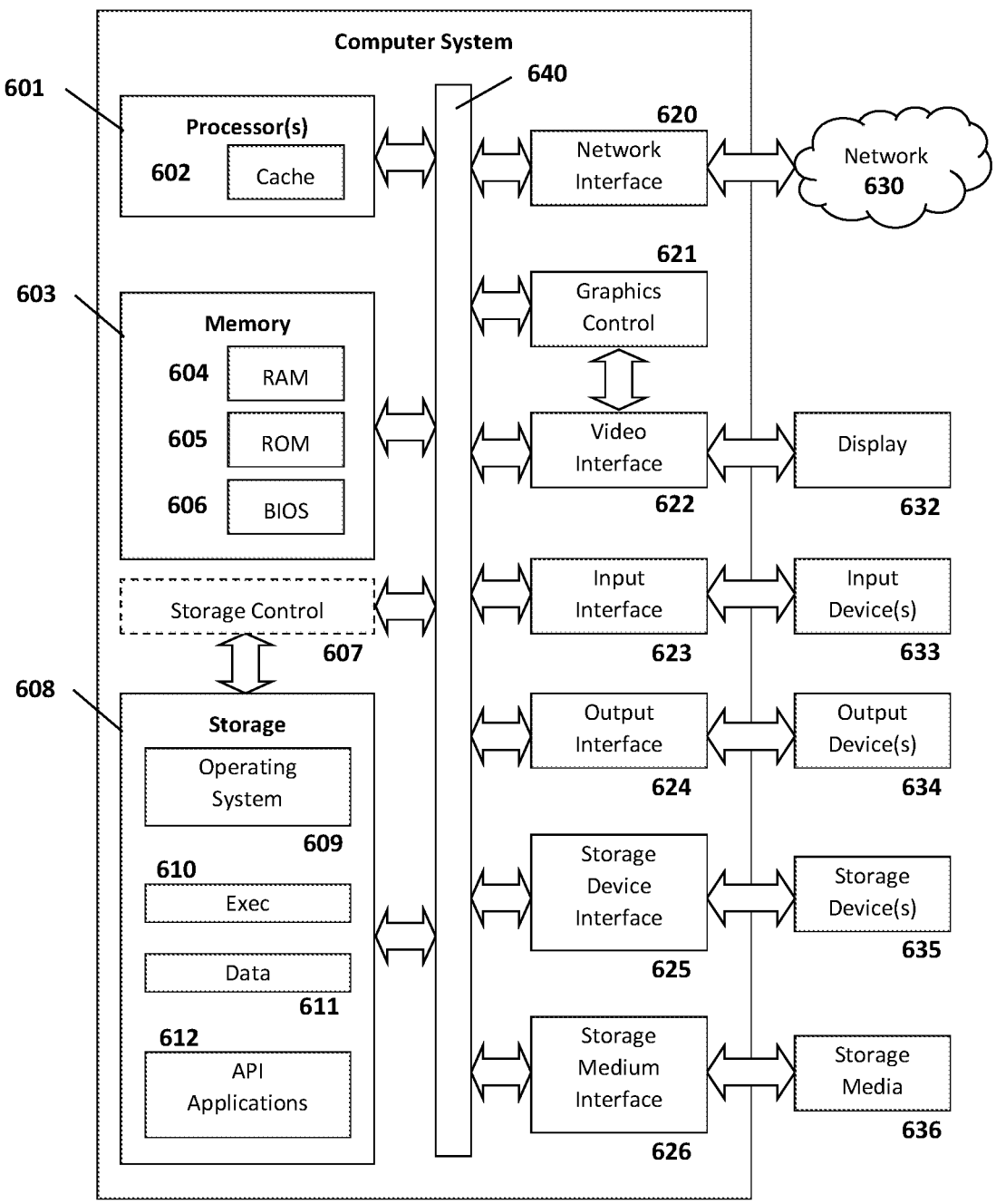
FIG. 6 shows a non-limiting example of a computing device; in this case, a device with one or more processors, memory, storage, and a network interface.

Referring to FIG. 6, a block diagram is shown depicting an exemplary machine that includes a computer system 600 (e.g., a processing or computing system) within which a set of instructions can execute for causing a device to perform or execute any one or more of the aspects and/or methodologies for static code scheduling of the present disclosure. The components in FIG. 6 are examples only and do not limit the scope of use or functionality of any hardware, software, embedded logic component, or a combination of two or more such components implementing particular embodiments.

Computer system 600 may include one or more processors 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 600 includes one or more processor(s) 601 (e.g., central processing units (CPUs), general purpose graphics processing units (GPGPUs), or quantum processing units (QPUs)) that carry out functions. Processor(s) 601 optionally contains a cache memory unit 602 for temporary local storage of instructions, data, or computer addresses. Processor(s) 601 are configured to assist in execution of computer readable instructions. Computer system 600 may provide functionality for the components depicted in FIG. 6 as a result of the processor(s) 601 executing non-transitory, processor-executable instructions embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., static RAM (SRAM), dynamic RAM (DRAM), ferroelectric random access memory (FRAM), phase-change random access memory (PRAM), etc.), a read-only memory component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, executable(s) 610, data 611, applications 612 (application programs), and the like. Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide non-volatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, distributed computing systems, cloud storage systems, cloud computing systems, and the like, connected to network 630. The network 630 may comprise ethernet, IP, serial buses, and other forms of communication between two or more IoT devices. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 630, may employ a wired and/or a wireless mode of communication. In general, any network topology may be used.

Information and data can be displayed through a display 632. Examples of a display 632 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 632, computer system 600 may include one or more other peripheral output devices 634 including, but not limited to, an audio speaker, a printer, a storage device, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PUP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, automation environment information, data source information, event information, state change information, event/activity correlation information, link salience information, algorithm information, and relationship information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, MongoDB, and the like. Suitable graph databases include, by way of non-limiting examples, ArangoDB, AnzoGraph DB, JanusGraph, Neo4j, Sparksee, Sqrrl Enterprise, and the like. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the software applications, systems, and methods described herein and are not meant to be limiting in any way.

Example—Use Case

In one of the use cases, Company A buys a Factory B, or Company A is looking to integrate data of an existing facility Factory B with another set of data (e.g., data from a Warehouse C owned by Company A) to provide better visibility of the operation of Factory B and/or Warehouse C. In many instances, Factory B may include a number of pieces of equipment that are connected to the internet that feature an IP address, i.e., IoT devices. However, if the accumulated data associated with the IoT devices is generated across a long period of time according to different standards by different service providers, it is quite possible that the data is not in a format that is readily understandable by Company A, and thus cannot provide actionable insight for Company A. For example, the data format may be in a proprietary format that is not useful for people in Company A to understand the operation of Factory B. In some cases, a sub-group of the IoT devices may be working together to form a system, for example, several chillers, cooling towers, air handling units (AHUs), fan coils, dampers, and thermostats. These IoT devices may have little or no interaction with the rest of the IoT devices in the same automation environment. However, because of the differences in the format of data, and the difference in the protocols that these IoT devices communicate, it may be difficult to know which IoT devices belongs to which sub-group.

More specifically, Factory B may be an example of an automated environment (e.g., IoT-connected ecosystem). The automated environment of Factory B may comprise electronically controllable equipment. For example, an automobile manufacturing Factory B has assembly line with sensors, actuators, and effectors, lighting systems, HVAC systems with temperature sensors, etc. It will be obvious to those skilled in the art that such electronically controllable equipment and/or devices are provided by way of example only. Each of these pieces of electronically controllable equipment and/or devices may be internet-connected and thus provide data for the operator of Factory B and the management team of Company A. Company A may also own other automobile manufacturing Factories H, I, and J, and a Warehouse C which stores parts for installation, such as brake components for cars. In many cases, each of the facilities B, H, I, J and C has tens of thousands of devices producing data, and they spread across millions of square feet, and use a multitude of protocols. In some cases, IoT devices located in different facilities may interact with each other to perform their proprietary functionalities, for example, a brake component inventory detector in the Warehouse C and a brake component installation speed sensor in the Factory B. In this case, these IoT devices may conceptually form a sub-group (e.g., subsystem) within the automation environment. Due to the lack of interoperability between the variety of IoT devices, in terms of both hardware variations and differences in the software running on them, it is hard to develop applications that work across the entire enterprise (i.e., Company A in this example). The following operations explain the solutions provided by the present subject matter to the above-mentioned problems.

The method provided by the present disclosure identifies a plurality of data sources associated with an automation environment. For example, a number of IoT devices are identified as data sources because they are capable of generating data associated with their operation respectively. The assembly line sensors, lighting system sensors, temperature sensors, etc. of Factory B may be identified as data sources in this case. The data source identification process may involve passive discovery, active discovery, and/or target interrogation. In some case, the passive discovery comprises observing traffic on a network, identifying an origin or a destination of the traffic on the network, and the like. In some cases, the active discovery comprises IP subnet scanning on a network, port scanning on a network, issuing protocol specific discovery commands on a network, or a combination thereof. In some cases, the target interrogation comprises introspecting at least one PLC on a network. By ways of these data source discovery methods, a variety of other IoT devices of Factories H, I, and J, and a Warehouse C are identified as data sources via the same data source identification process. As described elsewhere herein, some IoT devices within an automation environment may form a sub-group wherein they work closely with each other, and it is difficult to identify which IoT devices are within a subsystem. Conventionally, to gain meaningful understanding of the data from these IoT devices, it may require manual reverse engineering logic of the data sources (IoT devices), via their respective programmable logic controller (PLC), to identify the internal correlations between the IoT devices. This process can be time and labor consuming and prong to human errors.

After the data source discovery and/or data source identification mechanism produces a list of potential data sources, the data extraction component may retrieve data from these potential data sources. In some cases, the retrieved data a unique address (e.g., physical address, virtual address, MAC address, hush of MAC address, etc.) for the data source (e.g., IoT device). In some cases, the retrieved data comprises a unique fingerprint identifying the data source. The data extraction/retrieving component may retrieve data on a schedule, in response to an event, as a result of passively observing communications among the data sources, or a combination thereof. For example, the data extraction component may retrieve temperature data from the temperature sensors. The temperature data may be associated with a timestamp indicating the temperature at a particular time of a day/week/month/year. The temperature data may also be associated with a location identifier indicating the temperature at a particular location of the facility. In another example, the data extraction component may retrieve installation speed data from the assembly line sensors. The installation speed data may indicate the speed that parts (e.g., car engines, brake components, wheels, etc.) are fed into the assembly lines. In some other cases, the installation speed data may indicate the speed that an installation is finished by the assembly line. The data extraction component may retrieve lighting data from the lighting system. The lighting data may be associated with a timestamp indicating whether the light is on at a particular time of a day/week/month/year and potentially the luminance. The lighting data may also be associated with a location identifier indicating where the lighting data is collected. In some other examples, the data extraction component may retrieve inventory data from an inventory sensor in the Warehouse C. The inventory data may indicate the amount of parts (e.g., engines, brake components, wheels, etc.) that are in stock in the Warehouse C. Additionally, the data extraction component may retrieve transportation data from a fleet of trucks that transport parts between Warehouse C and Factories B, H, I, and J. The transportation data may indicate the transportation capacity of the fleet of trucks, idling durations of the trucks, and the time durations required for delivery across different time of a day (i.e., rush hours vs. non-rush hours), different time of a week (i.e., weekdays vs. weekend), different time of a year (i.e., winter time with closed highways vs. summer time with no potential closures).

Next, the activity detection component may detect activity associated with the data sources (IoT devices) based on the extracted data. In some cases, the activity may be events or state changes associated with data sources. In some embodiments, the activity detection component may retrieve activities previously stored in a database. This operation may be implemented by inspecting communications in accordance with a communication protocol. In some embodiment, the communication protocols comprise the native protocol, such as BACnet, modbus, S7, or other automation protocol that the source is able to speak or respond on, or the file format if pulling data from a file, such as a CSV. In various embodiments, activity is detected on a schedule, in response to an event, as a result of passively observing communications among data sources, or pushed from the source directly to this extraction component, or some combination of these. In some embodiments, detecting activity is performed by a gateway, slave controller, or a computer in communication with the automation environment directly, indirectly, via a cloud service, or any combination thereof. As this component detects activity, it actively forwards it to other mechanism, such as the activity correlation determination mechanism, which typically transits a network. In preferred embodiments, the receiving end of this data will store the activity in its raw form so that the raw data could be replayed in to the system if any of the subsequent components are improved after the initial detection of the activity through the system. In some embodiments, when there is a difference in data value or data structure between the state data and the configuration data (e.g., previously parameters associated with the data source), it is an indication of activity (e.g., state change) and will be registered in a registry, a database table, an index or the like for later use by the activity correlation determination mechanism. For example, if the temperature data extracted from temperature sensor O at 8 PM on Jan. 27, 2021 is 27° C.; and the temperature data extracted from the same temperature sensor O at 11 PM on the same day (Jan. 27, 2021) is 20° C., then this is an activity associated with the temperature sensor O and will be stored as an activity in a database.

Following detecting activities associated with a number of IoT devices, the storage component may store the data (e.g., activities) in a format that is suitable for later user. For example, a simple relational database could be used to store activity data. In other embodiments, a combination of relational database and a time-series database may be used by the storage component. In another preferred example, the activity detection component utilizes a graph database to store the activity data along with other data associated with the data sources. A graph database is a database that uses graph structure for semantic queries with nodes (please note that "node" and "vertex" are used interchangeably in this application), edges, and properties to represent and store data. The data storage component (e.g., events or state changes storage mechanism) of the present subject matter provides a data structure wherein each vertex (node) in the graph also has a time-series store to capture state changes (i.e., activities) overtime. The time-series store may be a standalone database, or it can be defined as a property of the vertex (node). For example, the temperature data extracted from temperature sensor O at 8 PM on Jan. 27, 2021 may be stored in a graph database. The node in the graph may represent sensor O (which is a data source according to the present disclosure) and the value is 27° C. The timestamp 8 PM on Jan. 27, 2021 is stored as property for this node in the graph of the graph database. The time-series store may be associated with the nodes, and it may reflect the activities (i.e., state changes) overtime and provide a user with actionable insight. Subsequently, for example, the temperature data extracted from the same temperature sensor O at a later time, such as at 11 PM on Jan. 27, 2021 may be stored in the graph database. The same node in the graph still represents sensor O and the value is changed to 20° C. The timestamp 11 PM on Jan. 27, 2021 is stored as property for this node in the graph of the graph database. This constitute an activity (event or state change) associated with sensor O. These activities associated with every IoT devices are observed by the present platforms and systems to determine correlation between activities associated with different data sources as described in more details elsewhere herein.

Next, the platforms or systems of the present disclosure may proceed to determine the correlation in the detected and stored activities. In some embodiments, the activity correlation determination mechanism may determine correlation in the detected activity between two or more of the data sources (e.g., IoT devices). In some embodiments, the activity correlation determination module identifies combinatorial pairs in the one or more identified data sources that having an activity within a predetermined time window, and then conducts pairwise testing for each of the identified combinatorial pairs of data sources by applying a correlation algorithm to the stored records of correlation in the detected activity over time. The pairwise testing conducted by the activity correlation determination module may determine one or more relationships for at least one identified combinatorial pair of data sources. The correlation algorithm comprises one or more of the following: Pearson correlation, Time Lagged Cross Correlation (TLCC), Windowed TLCC, Dynamic Time Warping (DTW), and Instantaneous Phase Synchrony. In some embodiments, the correlation algorithm comprises a machine learning (ML) model. The ML model comprises one or more of the following: neural networks, deep neural networks, support vector machines (SVM), Bayesian models, linear regression, logistic regression, and/or k-means clustering. In some other embodiments, the activity correlation determination mechanism comprises statistical analysis of counts of the stored records of determined correlation in the detected activity over time. The statistical analysis comprises autocorrelation/serial correlation, partial autocorrelation, cross-correlation, or a combination thereof.

For example, the activity correlation determination mechanism may look for statistical correlations between activity in two or more pieces of equipment. If one piece of equipment always turns on right after a state changes (e.g., change from state 1 to state 2) of another piece of equipment, the two events may be correlated. For example, a temperature sensor O has an activity between 8 PM and 11 PM, wherein the value (representing the temperature) in the database drops from 27° C. to 20° C. During the same period of time, a HVAC system P is turned off (manually, or according to a preset schedule). This power down event of the HVAC system is previously detected and stored in the database as well. The activity correlation determination mechanism may identify these two IoT devices as a potential combinatorial pair because of the synchrony between the state changes associated with temperature sensor O and HVAC system P during the same time window (i.e., 8 PM to 11 PM). Therefore, there is a high probability that the two pieces of equipment is related. The counts of these correlations over time should be stored as a property or metadata associated with edge between two vertices in the graph, as described elsewhere herein in connection with the storage mechanism. Notice that there may be other factors affecting the temperature as well, the identified potential combinatorial pairs will be tested later with an algorithm to determine whether there is a true combinatorial pairing relationship between them. For example, a machine learning algorithm may perform a pairwise testing for each identified potential combinatorial pair. In some embodiments, the machine learning algorithm may closely monitor any activities during another time window of a day, a week, a month, or a year. For example, in the above example related to the temperature sensor O and HVAC system P, it is possible that the HVAC system is located on the west side of a big facility, and the temperature sensor O is located on the east side of the facility. The temperature drop is because of the temperature drop between daytime and nighttime, or because of the power off of an assembly line near sensor O. The machine learning algorithm may perform pairwise testing for this pair of data source (i.e., temperature sensor O and HVAC system P) by monitor other activities. If during another period of time that the HVAC system P is powered off for some reason, but the temperature sensor O's value (i.e., temperature) does not drop, then they are not a true combinatorial pair and should be de-linked in a database. If every time or almost every time when the HVAC system P is powered off (or turned down), there is corresponding value changes with temperature sensor O, then it is safe to conclude that they are a combinatorial pair. The machine learning (ML) algorithm may perform this type of pairwise testing automatically, once properly trained, for all the identified potential combinatorial pairs. In any event, the identified correlation between data sources and the counts of the activity correlations are stored in a first database (e.g., a sub-storage unit of a storage system) for later use.

The correlation records storage system (i.e., the first database in some embodiments) is responsible for storing records of determined correlation in the detected activity over time. In some embodiments, the correlation records storage mechanism comprises a graph database, and the determined correlation may be stored, in the graph database, as a property or metadata associated with the edge between two vertices in the graph. This correlation records storage mechanism may be a stand-alone storage, or it may be a sub-storage unit of a universal storage system. In some embodiments, the correlation between the activities associated with two data sources (IoT devices) may be stored as a property for the edge connecting the two nodes representing the two data sources. For example, Node O may represent sensor O, and Node P may represent HVAC system P in a graph; and the edge I between Node O and Node P may represent a relationship or correlation between the two data sources (IoT devices, in this case, sensor O and HVAC system P). As described elsewhere herein, the correlation between activities associated with Node O and Node P may be determined by the activity correlation determination component, and the correlation may be, in this case, a causal relationship between the sensor O and HVAC system P. Therefore, the edge I between Node O and Node P may reflect this causal relationship by presenting it as a directional edge from Node P to Node O. During the time of determining the correlation between activities associated with Node P and Node O, the activity correlation determination component may find a number of times of correlations between the activities, for example, five (5) times within a two (2) day window. This frequency of detected correlation, i.e., counts of the correlation records, may be stored as a property associated with the edge I, which may represent how strong of a correlation between the two IoT devices. This correlation count may be later utilized to determine a sub-group (subsystem) as described elsewhere herein.

Following the platforms and systems of the present disclosure determines the correlation and stores the correlation records in a storage system, a link salience component may identify subsystems in the automation environment. In some embodiments, the link salience component may apply a link salience algorithm to the stored records of the determined correlation to determine a salience property, and identify subsystems in the automation environment based on the salience property. As described elsewhere herein, the data from data source may be stored in a graph database, and the correlations (i.e., relationships) between data sources may be represented by edges in the graph. For example, the edge between sensor O and HVAC P may be used to store the relationship between them. The link salience mechanism may apply a link salience to the stored relationship or records of determined correlation between them to determine a salience property. For example, the edge between sensor O and HVAC P may have a property, which defines the weight of the edge. In some embodiments, the counts of determined correlation between two data sources may be used to determine the weight of the edge. When there are more counts of correlations, the weight of the edge may be assigned with a bigger number. Next, the distance between two nodes (e.g., vertices representing data sources) is defined by 1/the weight. When the correlation counts value is a greater number, the weight is a bigger number, thus the distance between two nodes is shorter in the graph. Once the distances between nodes are calculated, the link salience component may compute the shortest path to all other nodes in the network (e.g., the automation environment). Next, the link salience component may combine all the edges into a set, which forms a Shortest Path Tree (SPT). For each edge in the SPT, the link salience component increases a salience counter, for example, increase the value of property for these edges by a predetermined amount (e.g., 1). For each node (e.g., each data source/IoT device), the link salience component repeats the above steps to generate a salience counter for the edges connecting them. For each edge, the link salience component may then divide the total salience counter by the total number of nodes in the network to generate a final salience property for the edges.

The graph database representing the automation environment uses nodes to represent the IoT devices and the edges to represent the correlations between IoT devices. In some embodiments, the property for the edges that defines the weight is the count of activity correlation, as described elsewhere herein. Because the automation environment (e.g., industrial or commercial environment) are generally distributed according to power law, the calculated salience will have a bimodal distribution. The bimodal distribution allows the link salience component to filter all edges by the top N % link salience to achieve a series of nearly fully connected sub-graphs (sub-systems) wherein nearly all routes between any two nodes in each sub-graph (subsystem) is unique. These sub-graphs consist of truck, branch, and leaf vertices. The leaf vertices have one edge, connecting the vertices to the sub-graph. The branch may have a few edges, and the truck vertices have more numbers of edges. The resulting sub-graph edges can be contributed back to the graph for storage and retrieval for later use. The edges may be unidirectional or bidirectional, depending on the methods for activity correlation detection and generation. Generally, a unidirectional edge may represent a causal relationship between the connecting nodes. These subsystems within a graph represents a sub-group of IoT devices and the correlation between them, which provides actionable insights for the data owner.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method comprising:
   a) detecting activity in a plurality of data sources associated with an automation environment by automatically issuing a set of commands to cycle a current data source in the plurality of data sources, wherein the set of commands to cycle comprises a command to power down the data source, a command to power up the data source, a command to reboot the data source, a command to change one or more parameters or configurations of the data source, or a combination thereof,
   b) determining correlation in the detected activity between a non-cycled data source and the current data source by monitoring the automation environment for events or state changes triggered by cycling the current data source, wherein the events or state changes are indicative of the correlation between the non-cycled data source and the current data source;
   c) storing records of determined correlation in the detected activity over time in a data storage system, wherein the records of determined correlation are associated, respectively, with timestamps;
   d) applying a link salience algorithm to the stored records of determined correlation in the detected activity to determine a salience property, wherein the stored records of determined correlation comprise one or more data changes associated with the records of determined correlations over time;
   e) analyzing the salience property to determine a correlation count during a pre-determined time period based at least in part on the timestamps associated with the records of determined correlation, wherein the correlation count is indicative of the degree of correlation between two or more of the data sources;

f) analyzing the stored records of determined correlation to extract directionality information associated with the correlations, wherein the directionality information is indicative of a causal relationship between data sources; and g) identifying one or more subsystems in the automation environment based on the salience property, the directionality information, and the correlation count.

2. The method of claim 1, wherein the automation environment comprises at least one networked industrial or commercial automation system.

3. The method of claim 1, wherein the plurality of data sources comprises at least one sensor, at least one actuator, at least one effector, at least one programmable logic controller (PLC), at least one automation controller, at least one data file, at least one cloud service, or a combination thereof.

4. The method of claim 1, further comprising identifying a plurality of data sources associated with an automation environment.

5. The method of claim 4, wherein the identifying the plurality of data sources is performed by passive discovery, active discovery, target interrogation, or a combination thereof.

6. The method of claim 5, wherein the passive discovery comprises observing traffic on a network or a serial bus.

7. The method of claim 6, wherein the passive discovery comprises identifying an origin or a destination for the traffic.

8. The method of claim 5, wherein the active discovery comprises IP subnet scanning on a network, port scanning on a network, protocol specific ID enumeration on a control bus, issuing protocol specific discovery commands on a network, or a combination thereof.

9. The method of claim 5, wherein the target interrogation comprises introspecting at least one device on a network.

10. The method of claim 1, wherein determining activity correlation comprises statistical analysis of counts of the stored records of determined correlation in the detected activity over time.

11. The method of claim 10, wherein the statistical analysis comprises autocorrelation/serial correlation, partial autocorrelation, cross-correlation, or a combination thereof.

12. The method of claim 1, wherein determining correlation in the detected activity between two or more of the data sources comprises:

a) identifying combinatorial pairs of data sources having activity within a predetermined time window;

b) conducting pairwise testing for each identified combinatorial pair of data sources by applying a correlation algorithm to the stored records of correlation in the detected activity over time; and c) determining one or more relationships for at least one identified combinatorial pair of data sources.

13. The method of claim 12, wherein the correlation algorithm comprises one or more of the following: Pearson correlation, Time Lagged Cross Correlation (TLCC), Windowed TLCC, Dynamic Time Warping (DTW), and Instantaneous Phase Synchrony.

14. The method of claim 12, wherein the correlation algorithm comprises a machine learning model.

15. The method of claim 14, wherein the machine learning model comprises one or more of the following: one or more neural networks, one or more deep neural networks, one or more support vector machines (SVM), one or more Bayesian models, linear regression, logistic regression, or k-means clustering.

16. The method of claim 1, wherein the data storage system comprises a graph database.

17. The method of claim 16, wherein the graph database comprises a representation of the automation environment.

18. The method of claim 16, wherein the graph database comprises a digital twin of the automation environment.

19. The method of claim 16, wherein individual data sources are represented as vertices in the graph database and relationships between the individual data sources are represented as edges in the graph database.

20. The method of claim 19, wherein each edge comprises counts of determined correlation in the detected activity over time.

21. The method of claim 20, wherein the counts of determined correlation in the detected activity over time are stored as a property or metadata associated with the edge.

22. The method of claim 16, further comprising contributing the identified subsystems back to the graph database as data enrichments.

23. The method of claim 22, wherein contributing the identified subsystems back to the graph database as data enrichments comprises creating, updating, or deleting vertices in the graph, edges in the graph, vertex properties in the graph, or edge properties in the graph.

24. The method of claim 1, wherein detecting activity in a plurality of data sources comprises passive inspection of packets or payloads on an automation control network associated with the automation environment.

25. The method of claim 1, wherein the detecting activity in a plurality of data sources comprises inspection of communications in accordance with a communication protocol, wherein the communication protocol comprises S7, BACnet, KNX, or a combination thereof.

26. The method of claim 1, wherein the detecting activity in a plurality of data sources is performed by a gateway, slave controller, or computer in communication with the automation environment directly, indirectly, via a cloud service, or any combination thereof.

27. A system comprising at least one computing device comprising at least one processor, a memory, and instructions executable by the at least one processor to create an application comprising:

a) a software module detecting activity in a plurality of data sources associated with an automation environment by automatically issuing a set of commands to cycle a current data source in the plurality of data sources, wherein the set of commands to cycle comprises a command to power down the data source, a command to power up the data source, a command to reboot the data source, a command to change one or more parameters or configurations of the data source, or a combination thereof;

b) a software module determining correlation in the detected activity between a non-cycled data source and the current data source by monitoring the automation environment for events or state changes triggered by cycling the current data source, wherein the events or state changes are indicative of the correlation between the non-cycled data source and the current data source;

c) a software module storing records of determined correlation in the detected activity over time in a data storage system, wherein the records of determined correlation are associated, respectively, with timestamps;

d) a software module applying a link salience algorithm to the stored records of determined correlation in the detected activity to determine a salience property, wherein the stored records of determined correlation comprise one or more data changes associated with the records of determined correlations over time;

e) a software module analyzing the salience property to determine a correlation count during a pre-determined time period based at least in part on the timestamps associated with the records of determined correlation, wherein the correlation count is indicative of the degree of correlation between two or more of the data sources;

f) a software module analyzing the stored records of determined correlation to extract directionality information associated with the correlations, wherein the directionality information is indicative of a causal relationship between data sources; and g) a software module identifying one or more subsystems in the automation environment based on the salience property, the directionality information, and the correlation count.

28. A computer-implemented method comprising:

a) detecting activity in a plurality of data sources associated with an automation environment by automatically issuing a set of commands to cycle a current data source in the plurality of data sources, wherein the set of commands to cycle comprises a command to power down the data source, a command to power up the data source, a command to reboot the data source, a command to change one or more parameters or configurations of the data source, or a combination thereof;

b) determining correlation in the detected activity between a non-cycled data source and the current data source by monitoring the automation environment for events or state changes triggered by cycling the current data source, wherein the events or state changes are indicative of the correlation between the non-cycled data source and the current data source;

c) storing records of determined correlation in the detected activity over time in a data storage system, wherein the records of determined correlation are associated, respectively, with timestamps;

d) applying a statistical or machine learning algorithm to the stored records of determined correlation in the detected activity to determine a property, wherein the stored records of determined correlation comprise one or more data changes associated with the records of determined correlations over time;

e) analyzing the property to determine a correlation count during a pre-determined time period based at least in part on the timestamps associated with the records of determined correlation, wherein the correlation count is indicative of the degree of correlation between two or more of the data sources;

f) analyzing the stored records of determined correlation to extract directionality information associated with the correlations, wherein the directionality information is indicative of a causal relationship between data sources; and g) identifying one or more subsystems in the automation environment based on the property, the directionality information, and correlation count.

29. A system comprising at least one computing device comprising at least one processor, a memory, and instructions executable by the at least one processor to create an application comprising:

a) a software module detecting activity in a plurality of data sources associated with an automation environment by automatically issuing a set of commands to cycle a current data source in the plurality of data sources, wherein the set of commands to cycle comprises a command to power down the data source, a command to power up the data source, a command to reboot the data source, a command to change one or more parameters or configurations of the data source, or a combination thereof;

b) a software module determining correlation in the detected activity between a non-cycled data source and the current data source by monitoring the automation environment for events or state changes triggered by cycling the current data source, wherein the events or state changes are indicative of the correlation between the non-cycled data source and the current data source;

c) a software module storing records of determined correlation in the detected activity over time in a data storage system, wherein the records of determined correlation are associated, respectively, with timestamps;

d) a software module applying a statistical or machine learning algorithm to the stored records of determined correlation in the detected activity to determine a property, wherein the stored records of determined correlation comprise one or more data changes associated with the records of determined correlations over time;

e) a software module analyzing the property to determine a correlation count during a pre-determined time period based at least in part on the timestamps associated with the records of determined correlation, wherein the correlation count is indicative of the degree of correlation between two or more of the data sources;

f) a software module analyzing the stored records of determined correlation to extract directionality information associated with the correlations, wherein the directionality information is indicative of a causal relationship between data sources; and g) a software module identifying one or more subsystems in the automation environment based on the salience property, the directionality information, and the correlation count.

* * * * *